(12) United States Patent
Rathweg

(10) Patent No.: US 7,424,983 B2
(45) Date of Patent: Sep. 16, 2008

(54) TAPE CARTRIDGE SOFT LOAD SYSTEM

(75) Inventor: Christopher Rathweg, Louisville, CO (US)

(73) Assignee: Quantum Corporation, San Jose, CA (US)

( * ) Notice: Subject to any disclaimer, the term of this patent is extended or adjusted under 35 U.S.C. 154(b) by 726 days.

(21) Appl. No.: 10/656,656

(22) Filed: Sep. 4, 2003

(65) Prior Publication Data

US 2005/0051653 A1 Mar. 10, 2005

(51) Int. Cl.
*G11B 23/04* (2006.01)

(52) U.S. Cl. .................................... 242/338.4; 360/93

(58) Field of Classification Search ................. 242/338, 242/338.1, 338.4; 360/93
See application file for complete search history.

(56) References Cited

U.S. PATENT DOCUMENTS

| | | | |
|---|---|---|---|
| 4,799,117 A * | 1/1989 | Ohyama | 360/96.5 |
| 5,140,487 A | 8/1992 | Tanaka et al. | |
| 5,191,494 A | 3/1993 | Lee | |
| 5,708,538 A | 1/1998 | Fujino et al. | |
| 5,812,340 A | 9/1998 | Nishijima et al. | |
| 6,311,915 B1 | 11/2001 | Rathwell | |
| 2003/0019968 A1 | 1/2003 | Masuda | |

FOREIGN PATENT DOCUMENTS

| EP | 1 054 396 A3 | 11/2000 |
|---|---|---|
| EP | 1 054 396 B1 | 11/2000 |
| WO | WO-00/30091 A1 | 5/2000 |

OTHER PUBLICATIONS

European Partial Search Report mailed on Mar. 6, 2008, for EP Application No. 04 25 5219, filed on Aug. 27, 2004, five pages.
European Search Report mailed on Jun. 4, 2008, for EP Application No. 04 25 5219, filed on Aug. 27, 2004, seven pages.

* cited by examiner

*Primary Examiner*—William A Rivera
(74) *Attorney, Agent, or Firm*—Morrison & Foerster LLP

(57) ABSTRACT

A tape drive system and method of operating a tape drive system are provided. The tape drive system may include: a stationary base; at least one guide projection mounted to the stationary base; and a receiver for receiving a tape cartridge and transporting the tape cartridge from an ejected position to a loaded position, the receiver including at least one guide slot mating with one of the guide projections, each guide slot being shaped to allow the receiver to move a first distance in a horizontal direction and a second distance in a vertical direction. The method of loading a tape cartridge into a tape drive system having a stationary base and at least one guide projection mounted to the stationary base may include: receiving a tape cartridge in a receiver having at least one guide slot having a first portion and a second portion; and moving the receiver from an ejected position to a loaded position. This moving of the receiver may be performed by passing the guide projection through the first portion of the guide slot to move the receiver a first distance in a horizontal direction; and passing the guide projection through the second portion of the guide slot to move the receiver a second distance in a vertical direction.

25 Claims, 40 Drawing Sheets

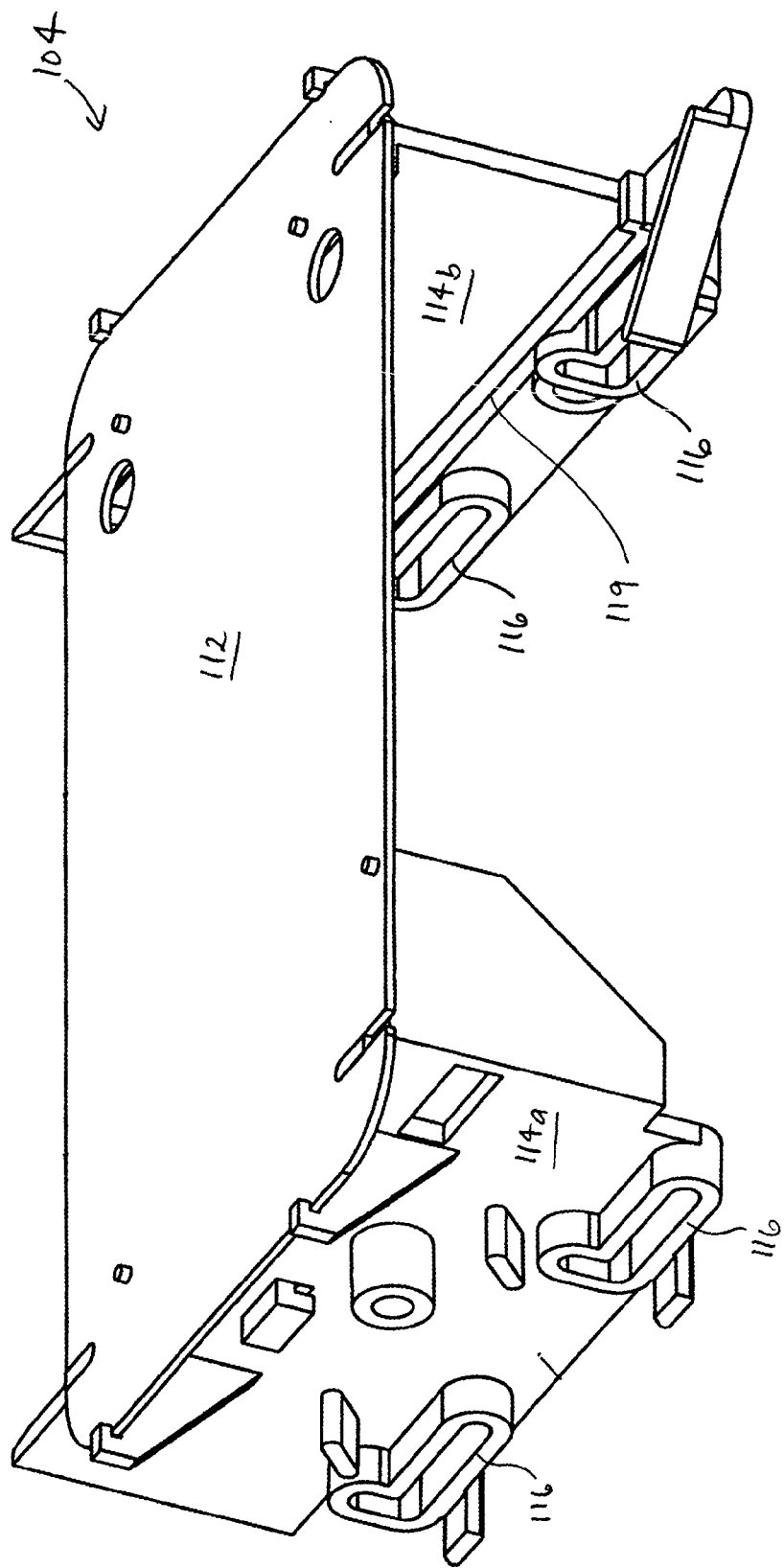

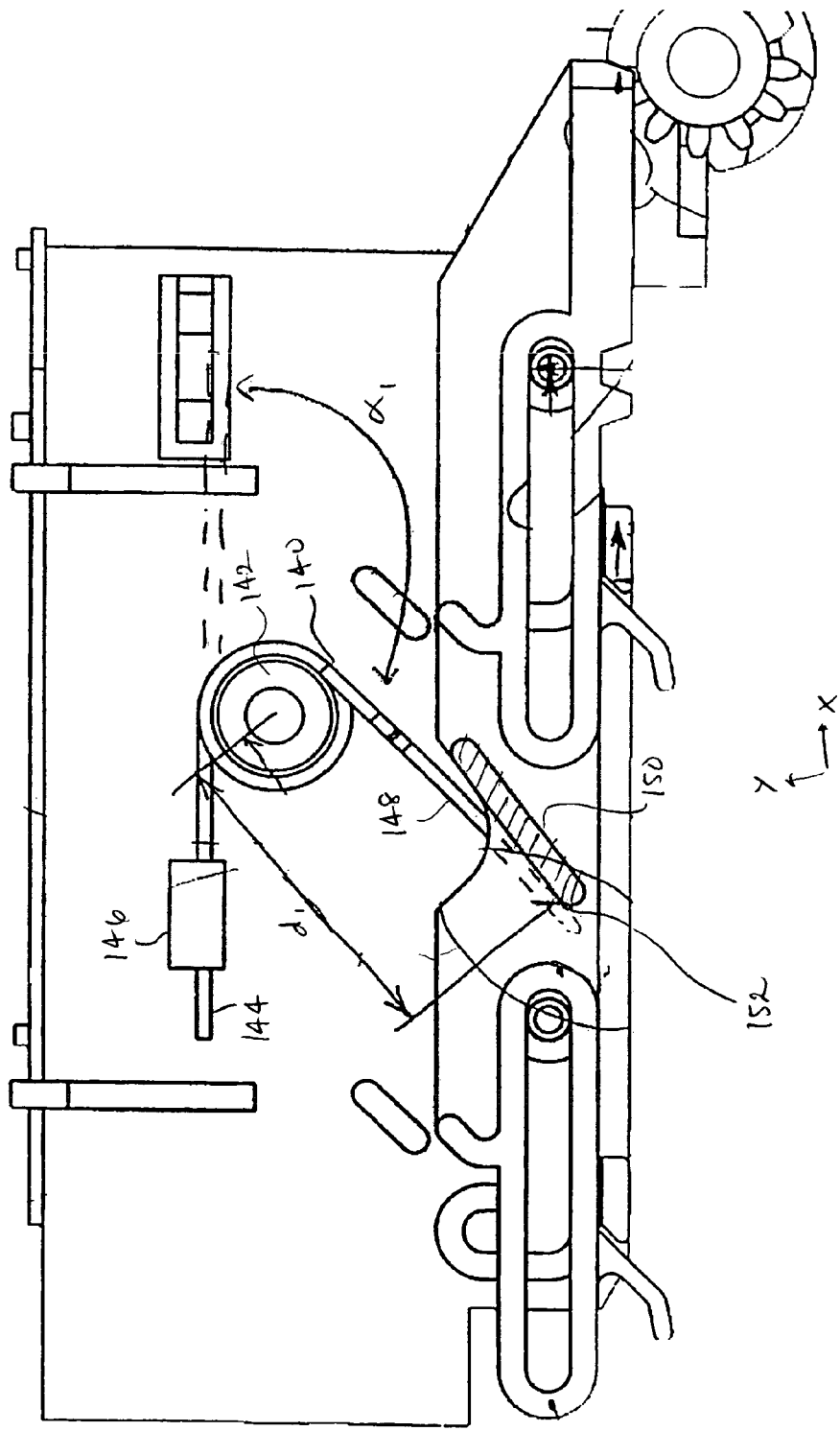

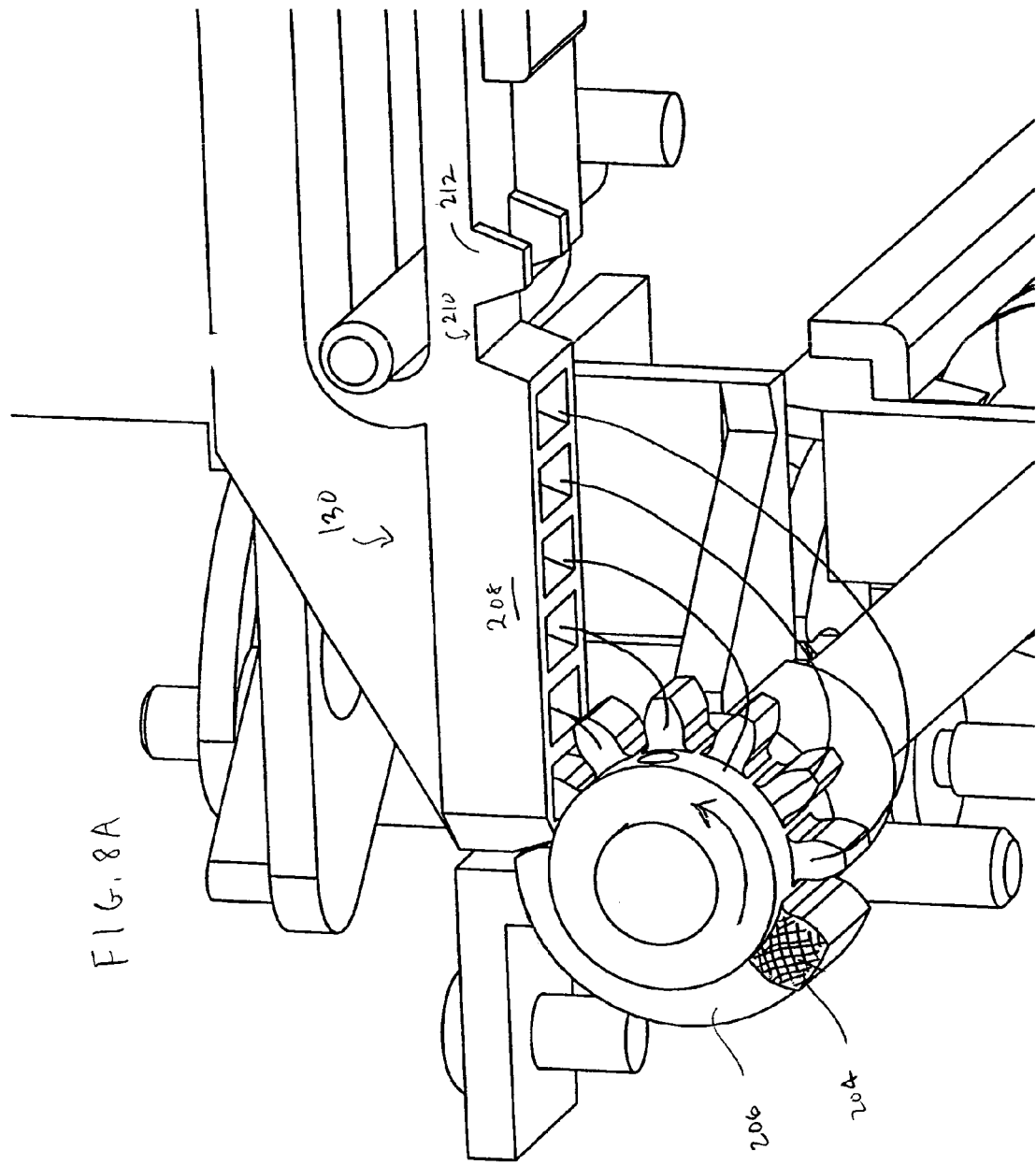

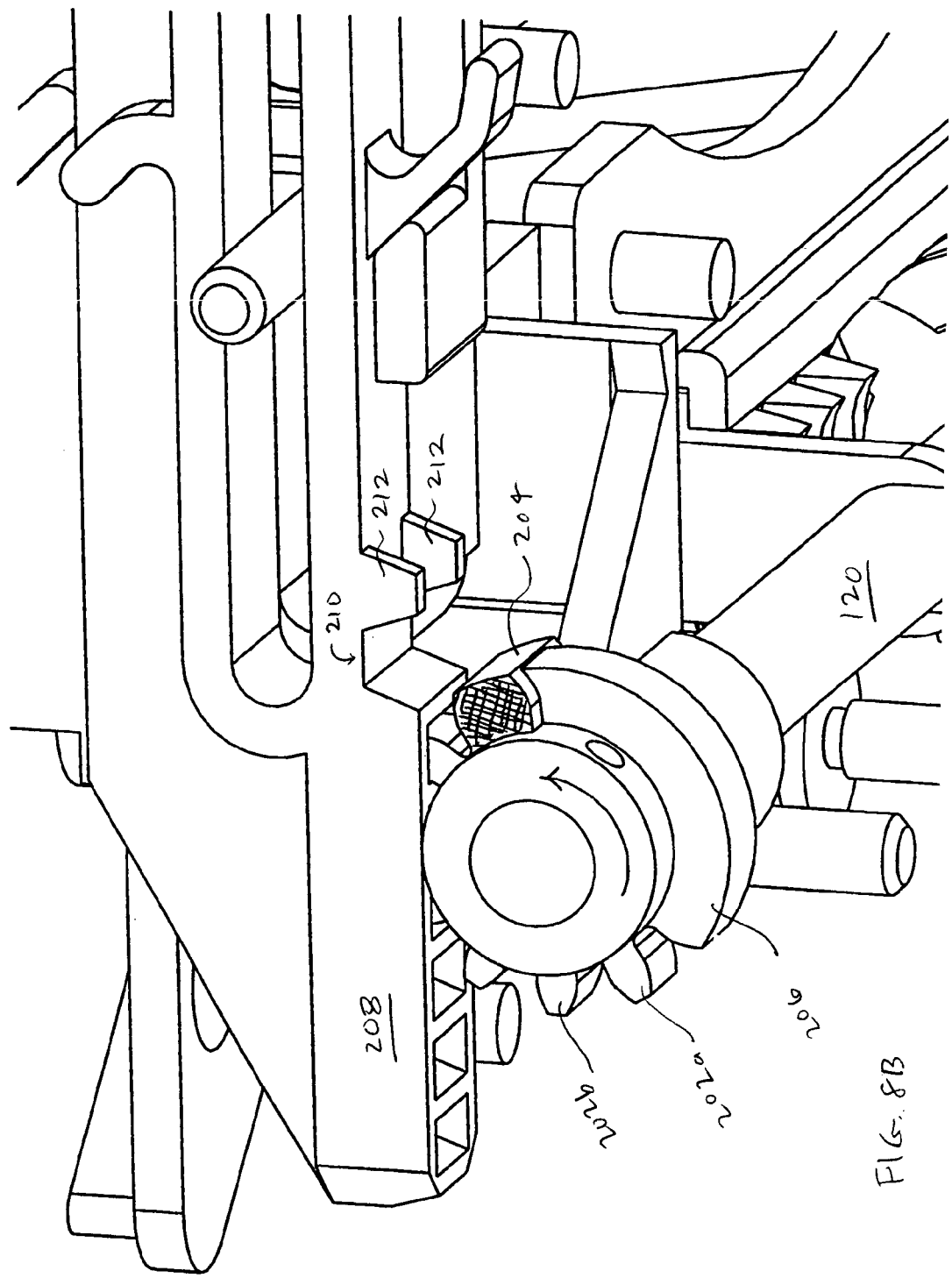

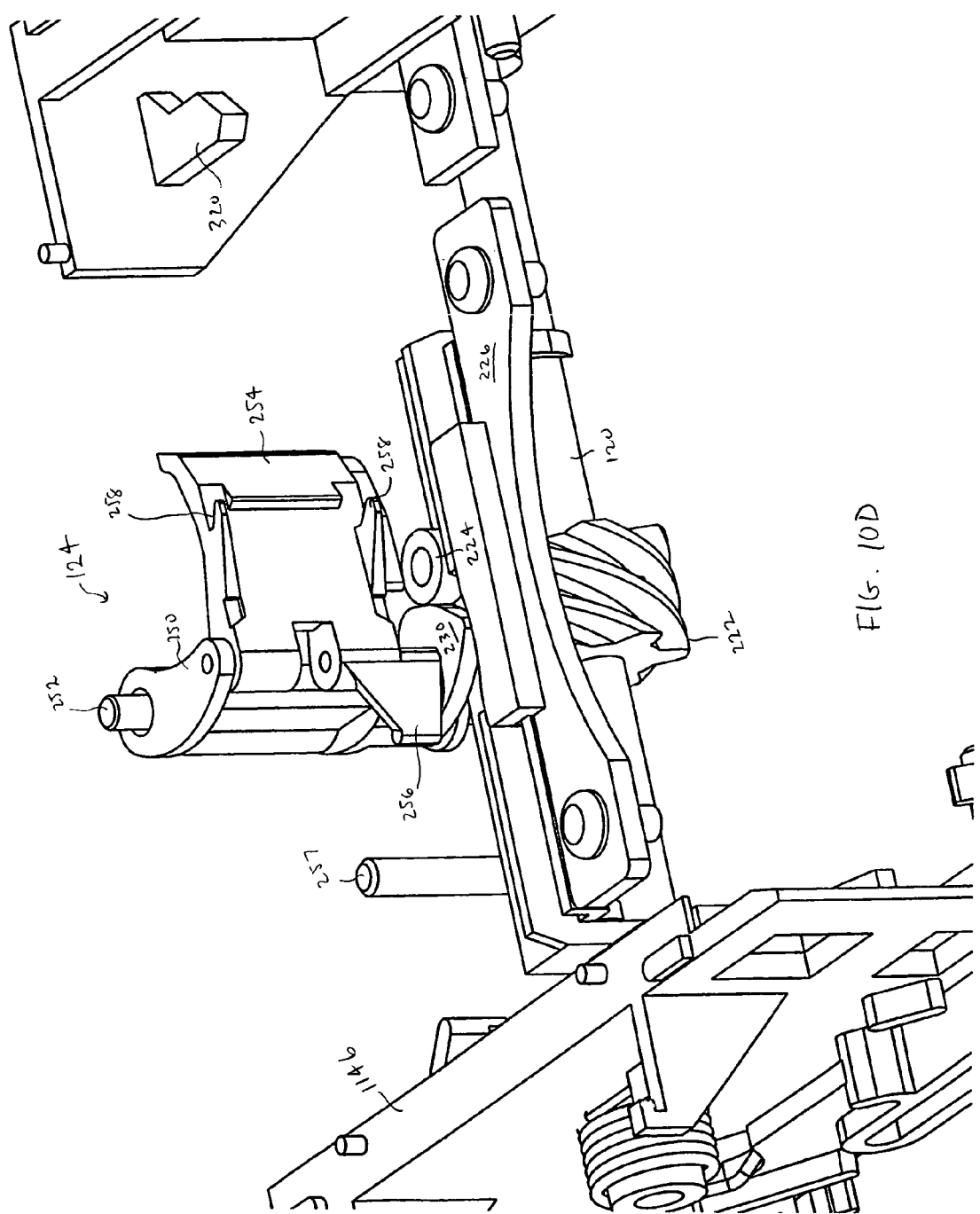

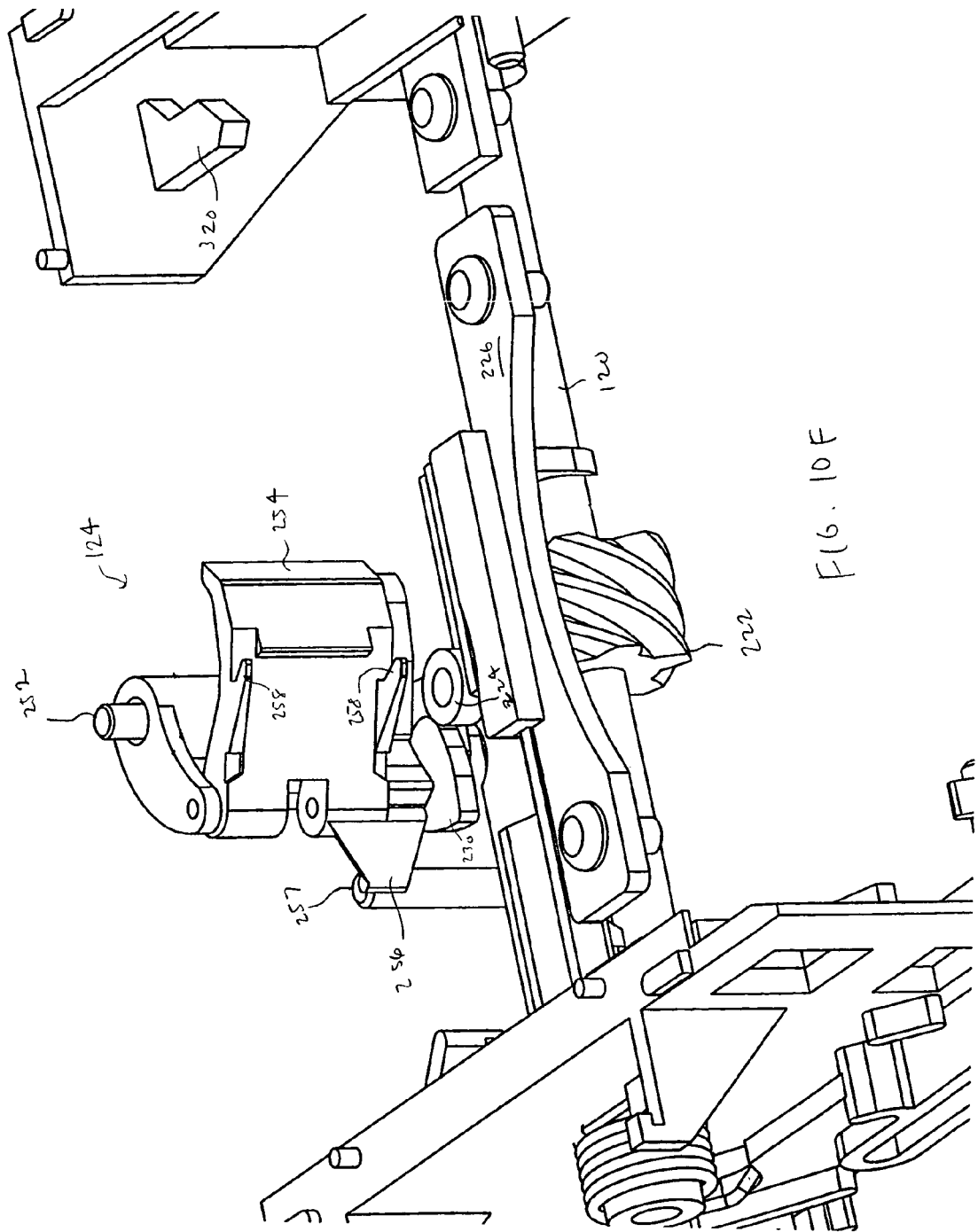

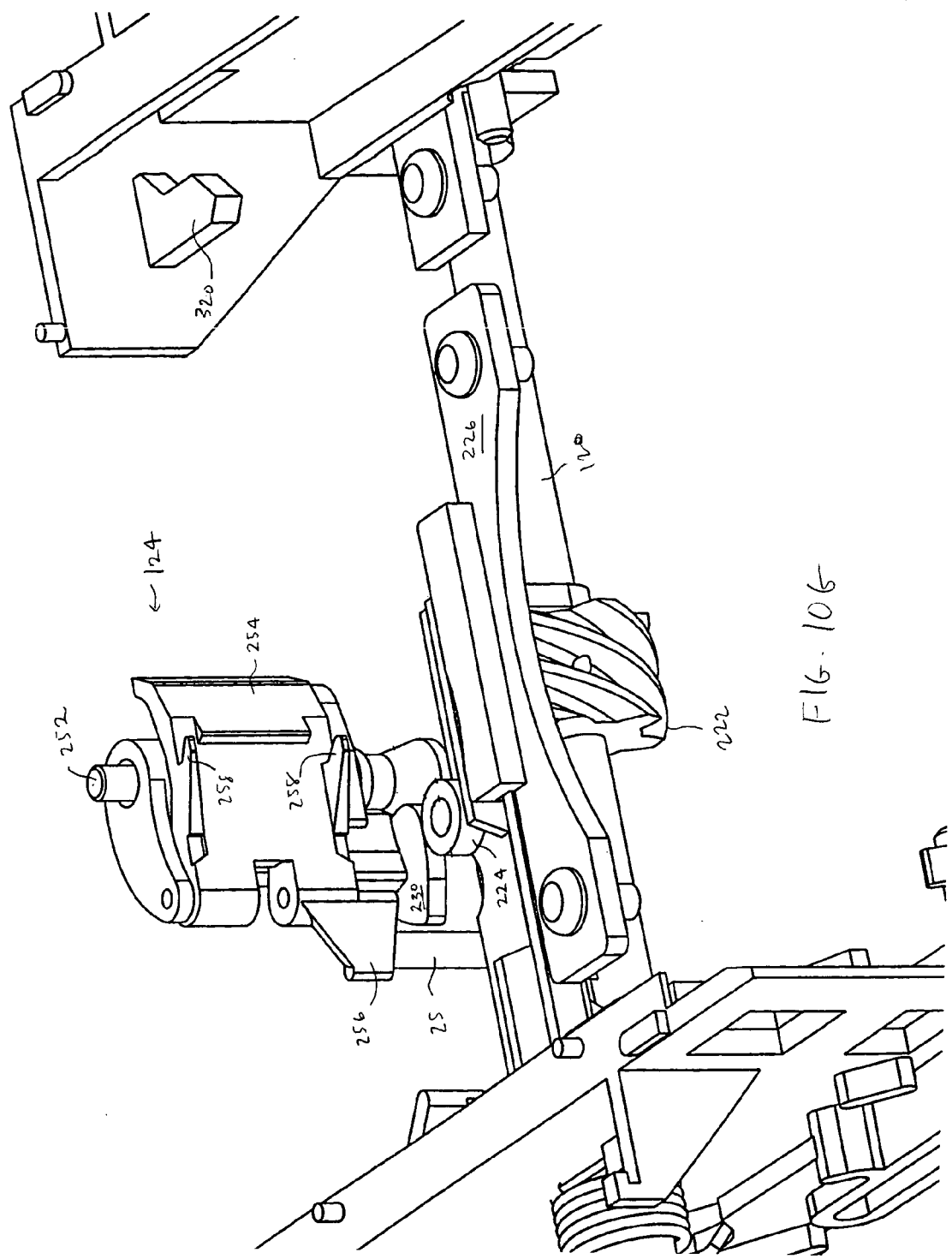

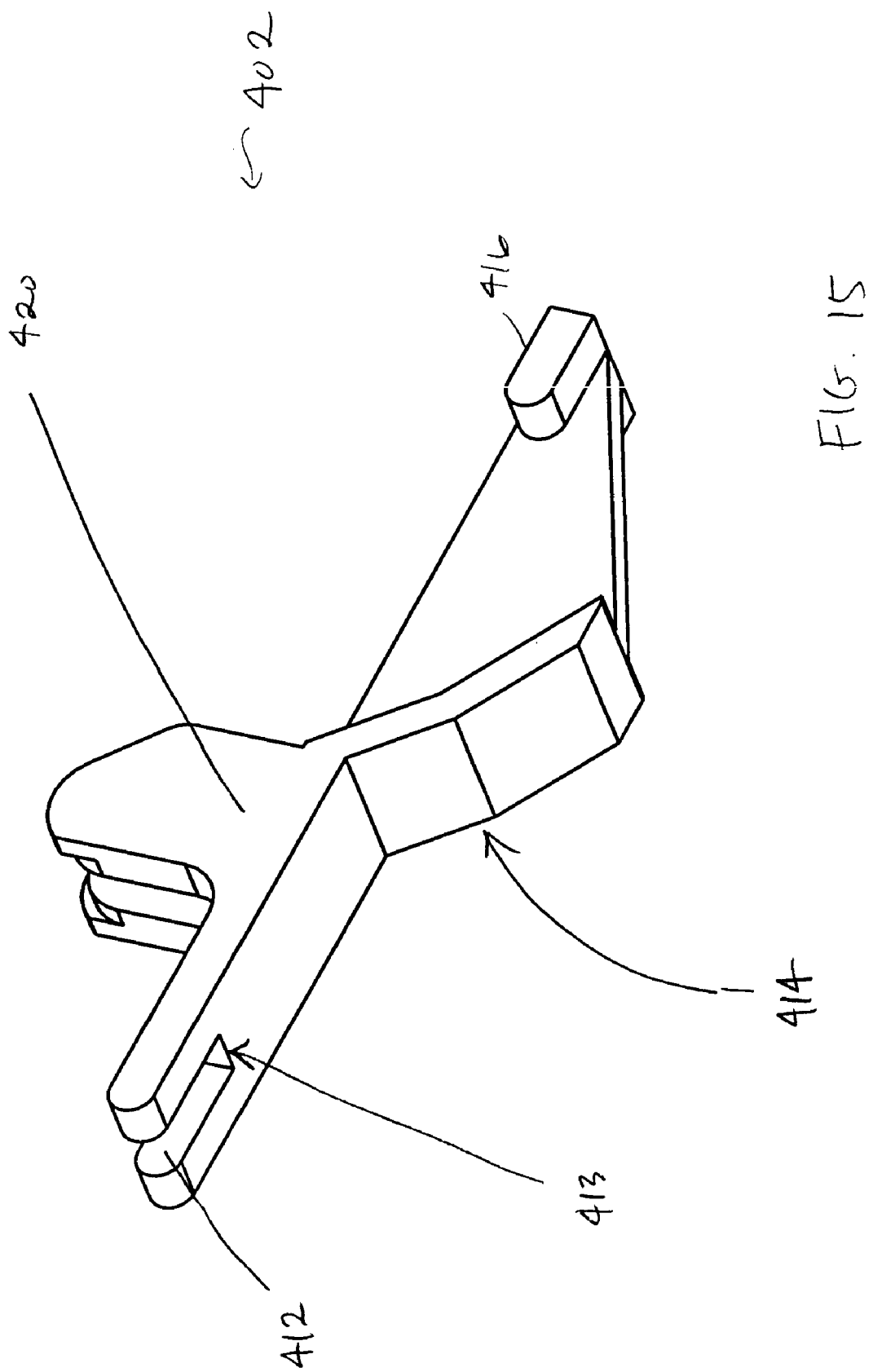

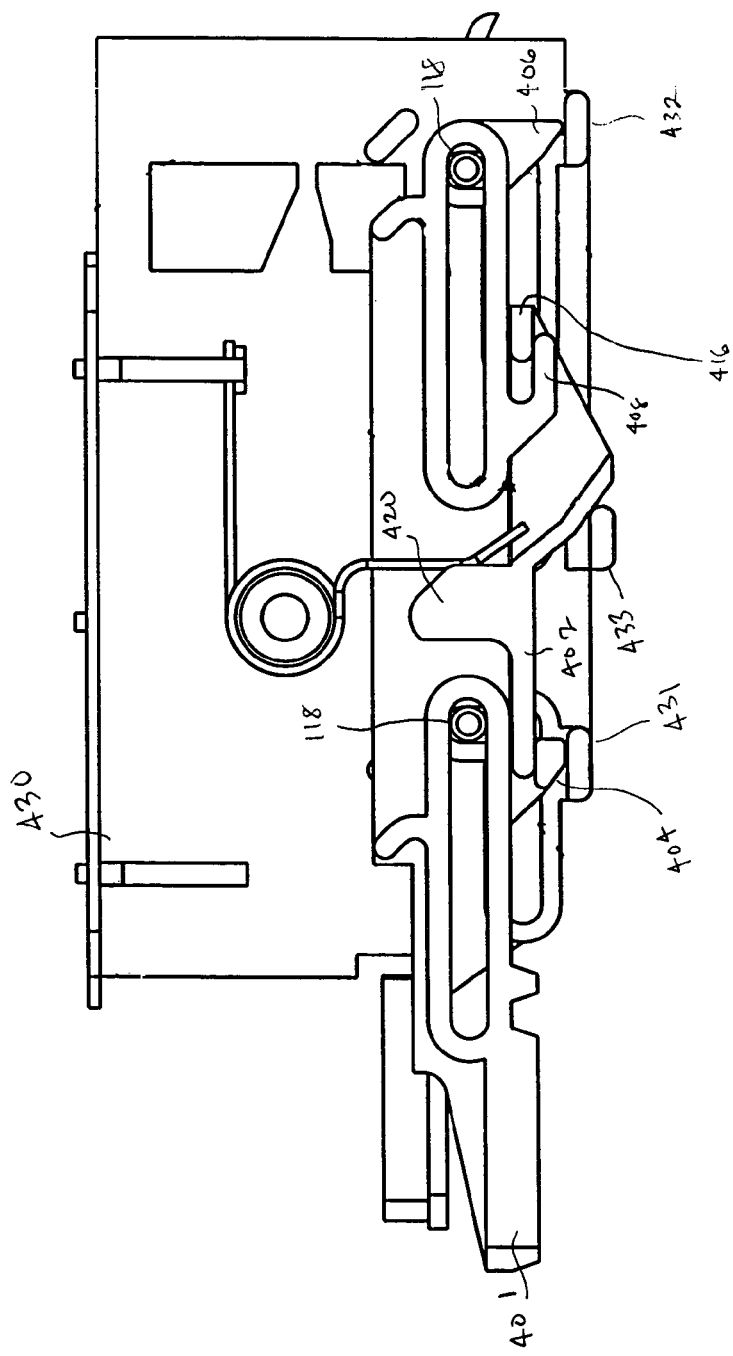

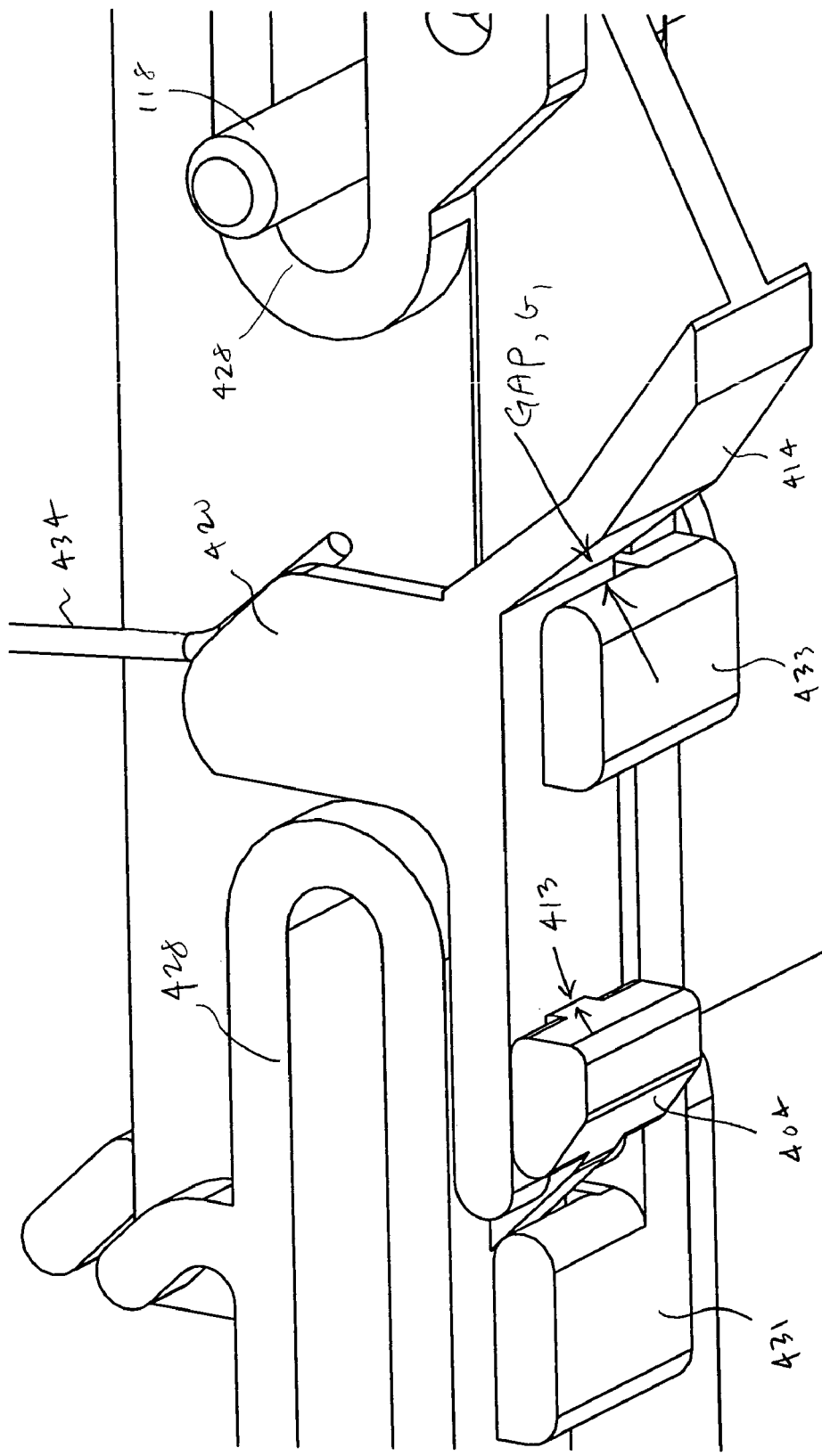

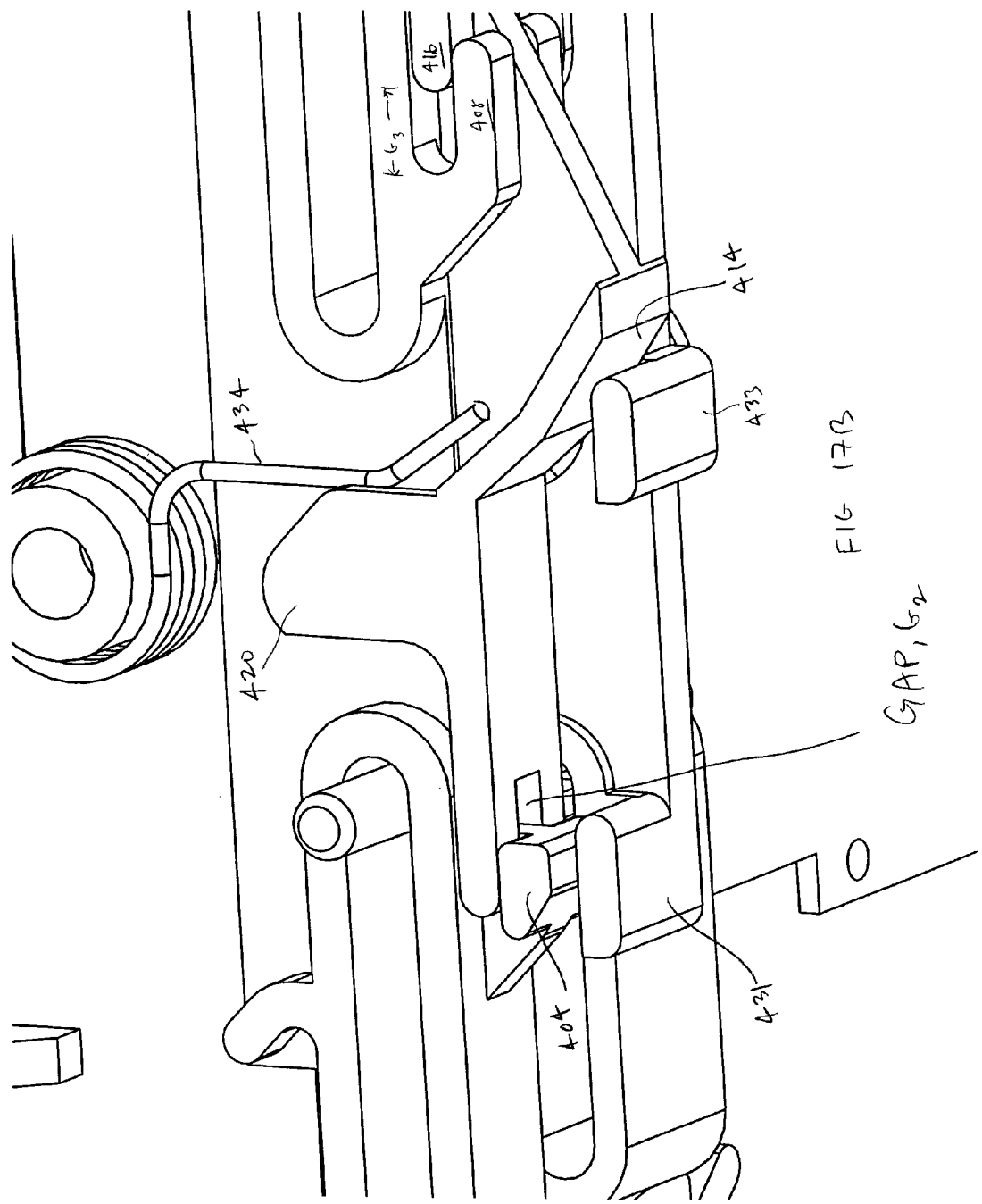

TAPE CARTRIDGE SOFT LOAD SYSTEM

BACKGROUND OF THE INVENTION

Storage subsystems, such as magnetic tape libraries, are widely used for storing information in digital form. These tape subsystems may include a storage subsystem controller for controlling one or more tape drives contained within the storage subsystem and for controlling other components of the storage subsystem, such as the tape picker, which is used to select and load tape cartridges into the tape drives. The storage subsystem may be coupled to a host system which transmits I/O requests to the storage subsystem via a host/ storage connection.

The tape drive reads and writes data to the primary storage medium, which can be a magnetic tape medium contained within a removable magnetic tape cartridge. The magnetic tape medium typically comprises a thin film of magnetic material which stores the data. The tape medium may be moved by the tape drive between a pair of spaced apart reels and past a data transducer to record or read back information. In one type of tape drive system, one of the reels is part of the tape drive while the other reel is part of the removable tape cartridge. For this type of tape drive system, the reel which is a part of the tape drive is commonly referred to as a take-up reel, while the reel which is a part of the tape cartridge is commonly referred to as a cartridge reel.

Various methods have been used for loading a tape cartridge into a tape drive. In some manual loading systems, the tape cartridge is inserted into the tape drive by, for example, a robotic picker mechanism. The picker arm is typically configured to apply a force to the back of the tape cartridge to fully insert the tape cartridge into the tape drive. Upon insertion of the tape cartridge into the tape drive, a reel driver having a set of gears matching a set of gears provided on the bottom of the cartridge reel rises to couple with cartridge reel in the tape cartridge. A cartridge leader on the magnetic tape is coupled to the take-up reel of the tape drive. In this type of manual loading system, the tape cartridge travels in a single plane during the loading process. The picker mechanism provides an insertion force in a horizontal direction to drive the front of the cartridge to the location where the take-up leader coupling is to occur. Once the tape cartridge is firmly seated in the tape drive, the reel driver in the tape drive rises in the vertical direction (orthogonal to the horizontal insertion direction) to couple with the cartridge reel.

In other systems, sometimes referred to as "soft load" systems, the tape cartridge is placed in an initial loading location by the picker mechanism. The tape drive then assumes control of the tape cartridge and repositions the tape cartridge into the fully loaded location. This positioning typically requires that the tape cartridge first be translated in the horizontal direction and then be translated in the vertical direction until a stationary reel driver in the tape drive couples with the cartridge reel. Soft load systems can enable the tape drive to more accurately locate the tape cartridge in the final loaded positioning, free from the effects of a manual human load or library robotics variations. However, soft load mechanisms typically require complicated mechanical components for performing the various positioning tasks and two-dimensional movements of the tape cartridge. Such systems can be expensive to manufacture, complicated to operate, and prone to failure. It may be desirable, therefore, to provide a tape drive soft load mechanism that is cheaper, simpler, and more robust than existing soft load systems.

BRIEF SUMMARY OF THE INVENTION

In accordance with embodiments of the present invention, a tape drive system is provided. The tape drive system comprises: a stationary base; at least one guide projection mounted to the stationary base; and a receiver for receiving a tape cartridge and transporting the tape cartridge from an ejected position to a loaded position, the receiver comprising at least one guide slot mating with one of the guide projections, each guide slot being shaped to allow the receiver to move a first distance in a horizontal direction and a second distance in a vertical direction. In some embodiments, the system further comprises: at least one receiver projection provided on the receiver; and at least one linearly moveable actuator comprising at least one cam engaging at least one receiver projection such that as the actuator moves horizontally, each cam engages one of the guide projections to effect movement of the receiver. In some embodiments, each guide slot is shaped to have a horizontal region and a vertical region; and each cam engages one of the receiver projections to drive the receiver to move first in the horizontal direction until the receiver travels the first distance and then in the vertical direction until the receiver travels the second distance. In yet other embodiments, each cam comprises a ramp such that as the cam engages the receiver projection to drive the receiver to move the first distance in the horizontal direction, the receiver projection remains in static contact with a beginning of the ramp, and as the cam engages the receiver projection to drive the receiver to move the second distance in the vertical direction, the receiver projection slides along the ramp.

In accordance with some embodiments of the present invention, the system further comprises a brake release lever comprising a body portion and a pivot portion rotatably coupled to the actuator and engaging a stationary member such that as the actuator moves horizontally, the pivot portion of the brake release lever translates horizontally while a distal end of the body portion of the brake release lever translates horizontally and vertically.

In accordance with some embodiments of the present invention, the system further comprises a spring applying an upward force on the receiver in the vertical direction.

In accordance with some embodiments of the present invention, a method of loading a tape cartridge into a tape drive system having a stationary base and at least one guide projection mounted to the stationary base is provided. The method comprises: receiving a tape cartridge in a receiver having at least one guide slot having a first portion and a second portion; and moving the receiver from an ejected position to a loaded position. This moving of the receiver may be performed by passing the guide projection through the first portion of the guide slot to move the receiver a first distance in a horizontal direction; and passing the guide projection through the second portion of the guide slot to move the receiver a second distance in a vertical direction.

In accordance with other aspects of the present invention, a method of loading a tape cartridge into a tape drive system is provided. The method comprises: receiving a tape cartridge in a receiver; rotating a drive shaft having a first gear and a second gear; engaging the first gear with a loading gear on a loading assembly to actuate movement of the receiver from an unloaded position to a loaded position; and engaging the second gear with a buckling gear on a buckler actuator to actuate buckling of a cartridge leader in the tape cartridge with a take-up leader in the tape drive system.

In accordance with other embodiments of the present invention, a tape drive system is provided. The tape drive system comprises: a motor; a drive shaft adapted to be rotated by the motor; a movable receiver for receiving and transporting a tape cartridge, the movement of the receiver being actuated by the drive shaft; and a buckler mechanism for coupling a take-up leader of the tape drive system with a cartridge leader of a tape cartridge, the buckler mechanism being actuated by the drive shaft. In some embodiments, the system further comprises: a buckler actuator movable in a linear direction and driven by the drive shaft, the buckler actuator configured to actuate the buckler mechanism to couple the take-up leader with the cartridge leader; wherein the buckler mechanism is rotatable about a buckling axis of rotation such that as the buckler actuator moves linearly, the buckler actuator contacts the buckler mechanism to cause the buckler mechanism to rotate about the buckling axis of rotation.

In accordance with some embodiments of the present invention, a tape drive system is provided. The system comprises: a motor; a drive shaft adapted to be rotated by the motor; a movable receiver for receiving and transporting a tape cartridge; a means for translating rotational movement of the drive shaft into movement of the receiver from an ejected position to a loaded position; a buckler mechanism for coupling a take-up leader of the tape drive system with a cartridge leader of a tape cartridge; and a means for translating rotational movement of the drive shaft into rotation of the buckler mechanism.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

BRIEF DESCRIPTION OF THE DRAWINGS

FIG. 3 is a perspective view of a receiver in accordance with embodiments of the present invention.

FIGS. 5A-5B are side views of a torsion spring in accordance with embodiments of the present invention.

FIGS. 8A-8D are magnified views of the drive shaft engaging an actuator in accordance with embodiments of the present invention.

FIGS. 10A-10G show the operation of a buckler assembly in accordance with embodiments of the present invention.

FIG. 15 shows an actuator clamp in accordance with embodiments of the present invention.

FIGS. 16A-16B show the operation of an actuator in accordance with embodiments of the present invention.

FIGS. 17A-17B show the operation of an actuator in accordance with embodiments of the present invention.

In the following description, reference is made to the accompanying drawings which form a part thereof, and which illustrate several embodiments of the present invention. It is understood that other embodiments may be utilized and structural and operational changes may be made without departing from the scope of the present invention. The use of the same reference symbols in different drawings indicates similar or identical items.

DETAILED DESCRIPTION OF THE INVENTION

Figure 1A:
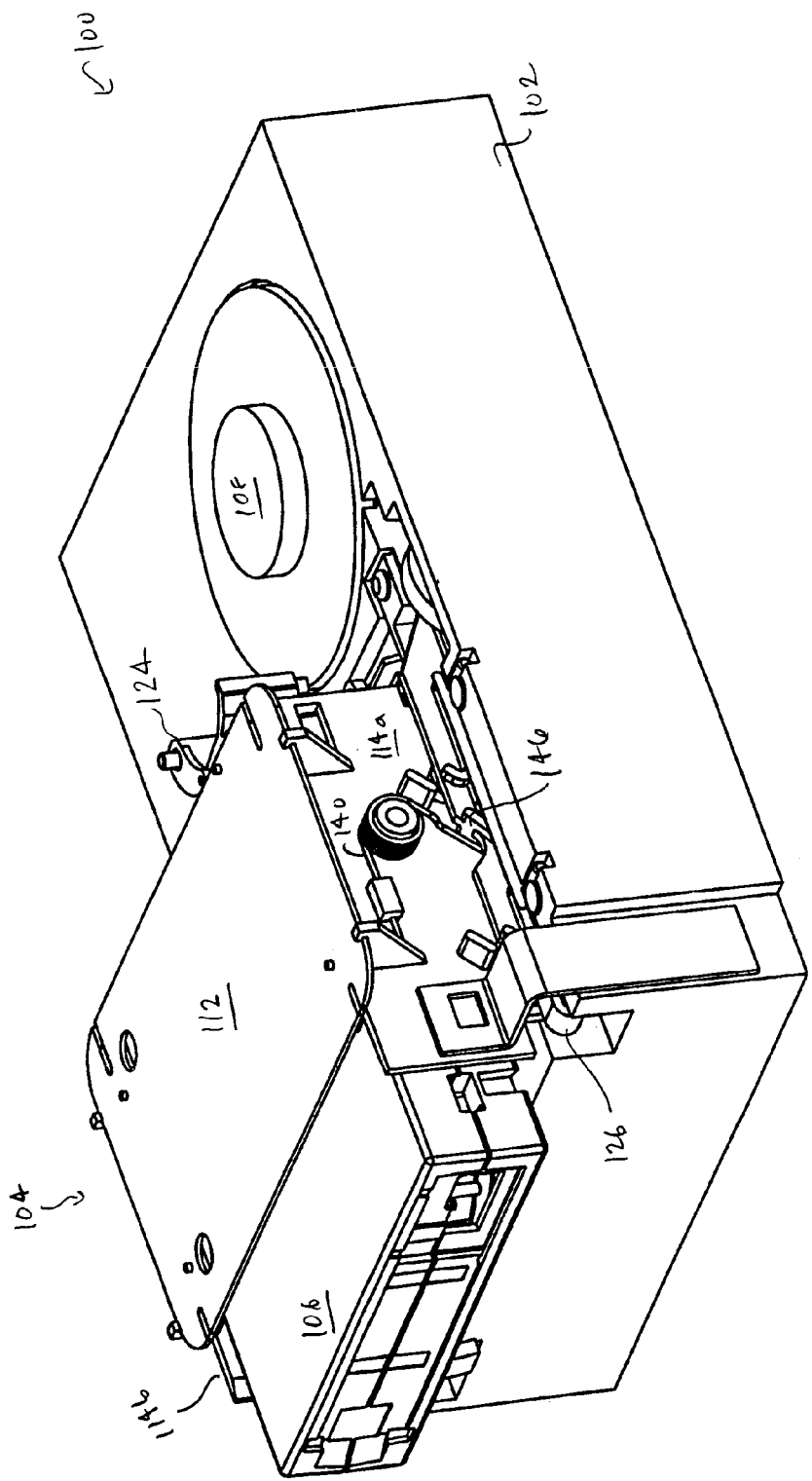
FIGS. 1A-1B are perspective views of a tape drive system in accordance with embodiments of the present invention.
Figure 1B:
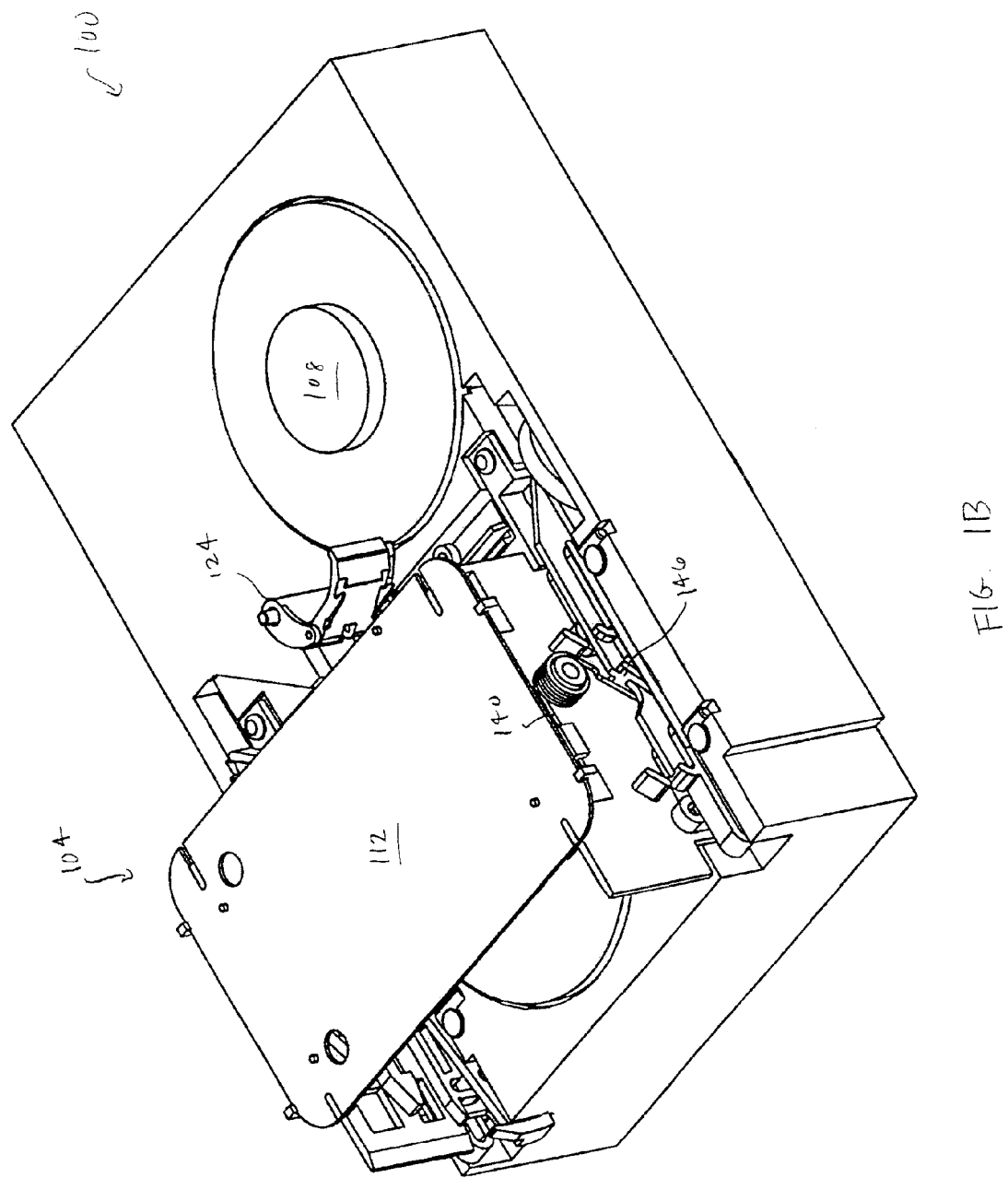
Figure 1C:
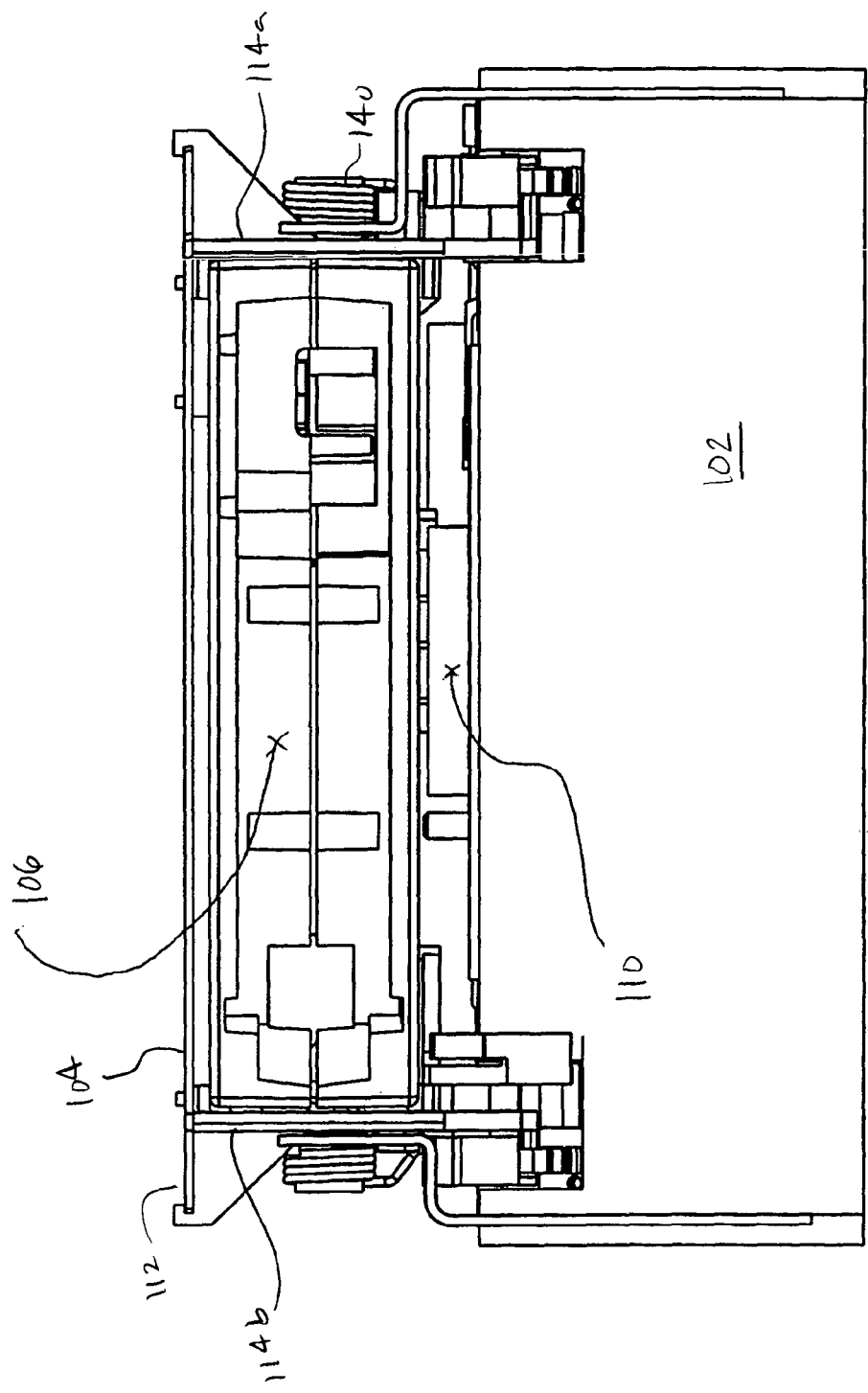
FIG. 1C is a front view of a tape drive system in accordance with embodiments of the present invention.

FIG. 1A shows in perspective view a tape drive system 100 in accordance with embodiments of the present invention. The tape drive 100 comprises a stationary tape drive body 102, a moving receiver 104 for receiving and translating a tape cartridge 106, and a take-up reel 108. The receiver 104 comprises a top plate 112 and two opposing side walls 114a-114b. An actuator 126 is provided adjacent to each of the side walls 114a-114b. In FIG. 1A, the receiver 104 and the tape cartridge 106 are shown in the initial load (or ejected) position. FIG. 1B is another perspective view of the tape drive system 100 with the tape cartridge 106 removed. FIG. 1C is a front view of the tape drive system 100 with the receiver 104 in the ejected position. Here, it can be seen that when the receiver 104 and tape cartridge 106 in the initial load (or ejected) position, the cartridge reel 107 (shown in FIG. 11) is not yet coupled with the reel driver 110 in the tape drive 100.

In accordance with aspects of the present invention, the receiver 104 is provided with one or more guide slots 116 which mate with stationary guide projections provided on the tape drive body 102. These guide slots 116 are shaped such that as the guide projections travel along the guide slots 116, the receiver 104 is translated first in a horizontal direction and then in a vertical direction. In accordance with further aspects of the present invention, one or more actuators 126 provide the propelling force for the receiver 104 to be guided by the guide slots 116 and the guide projections to move from the ejected position to a loaded position. The actuator 126 can be driven in a linear direction by a rotating drive shaft 120. The linear movement of the actuator 126 can be used to effectuate movement of the receiver 104 in both the horizontal direction and the vertical direction.

Figure 2:
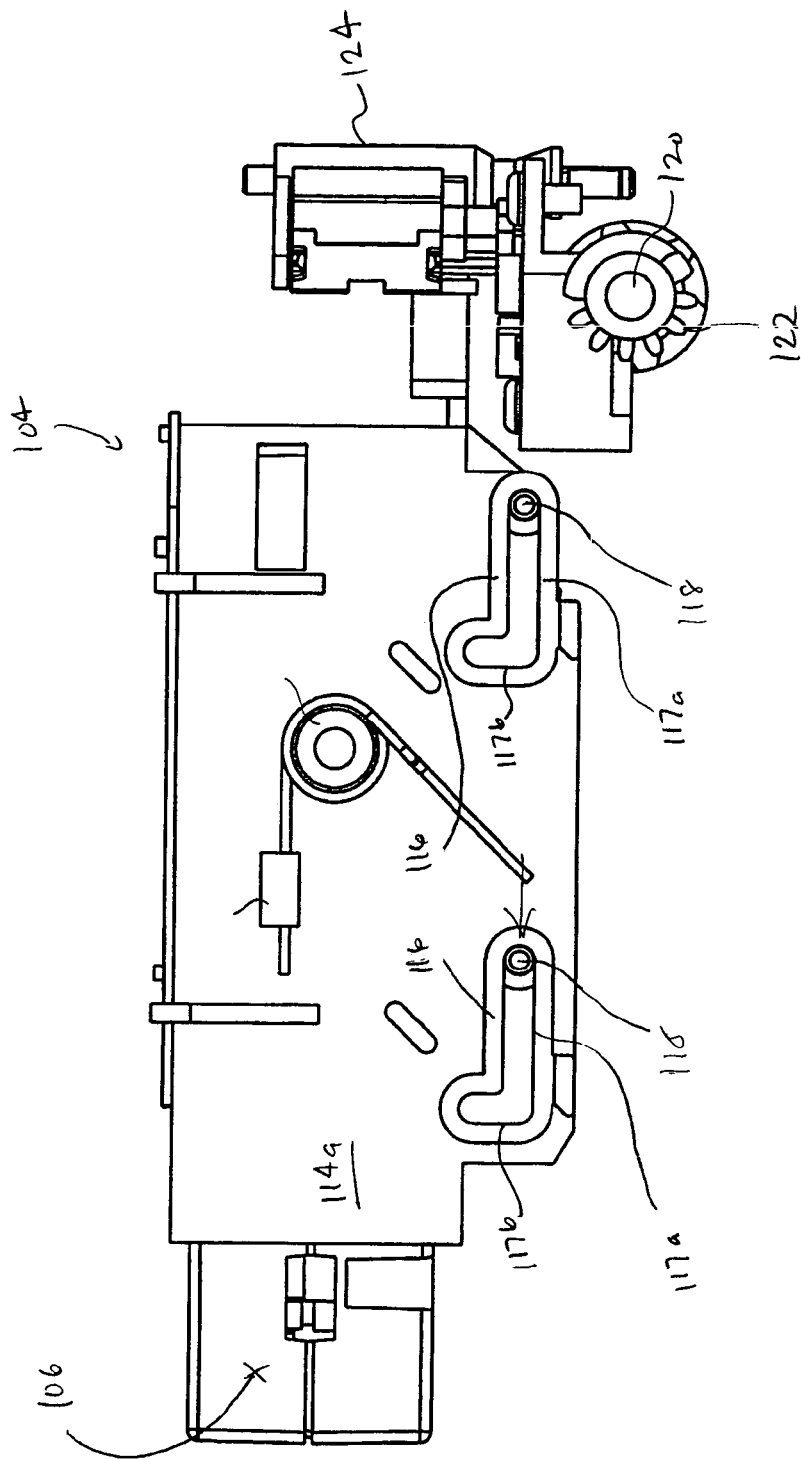
FIG. 2 is a side view of some of the components of a tape drive system in accordance with embodiments of the present invention.

FIG. 2 is a side view of some of the components of the tape drive 100. In this view showing the receiver 104 in the ejected position, it can be seen that the first side wall 114a is provided with a pair of guide slots 116. These guide slots 116 mate with stationary guide projections, shown in FIG. 2 as guide pins 118. The guide pins 118 are fixedly mounted to the stationary drive body 102.

FIG. 3 is a perspective view of the receiver 104 showing side wall 114a and the opposing side wall 114b having a similar pair of guide slots 116 for mating with another pair of guide pins 118 fixedly mounted to the stationary tape drive body 102. The side walls 114a-114b also include interior flanges 119 that support the tape cartridge 106 when the tape cartridge 106 is inserted into the receiver 104.

The tape drive 100 may further include a drive shaft 120 having drive shaft gears 122, and a buckler assembly 124. The drive shaft 120 and buckler assembly 124 are rotatably mounted to axes which are, in turn, coupled to the tape drive body 102, such that the drive shaft 120 and buckler assembly 120 do not move horizontally or vertically with the receiver 104 during the loading process.

Figure 4A:
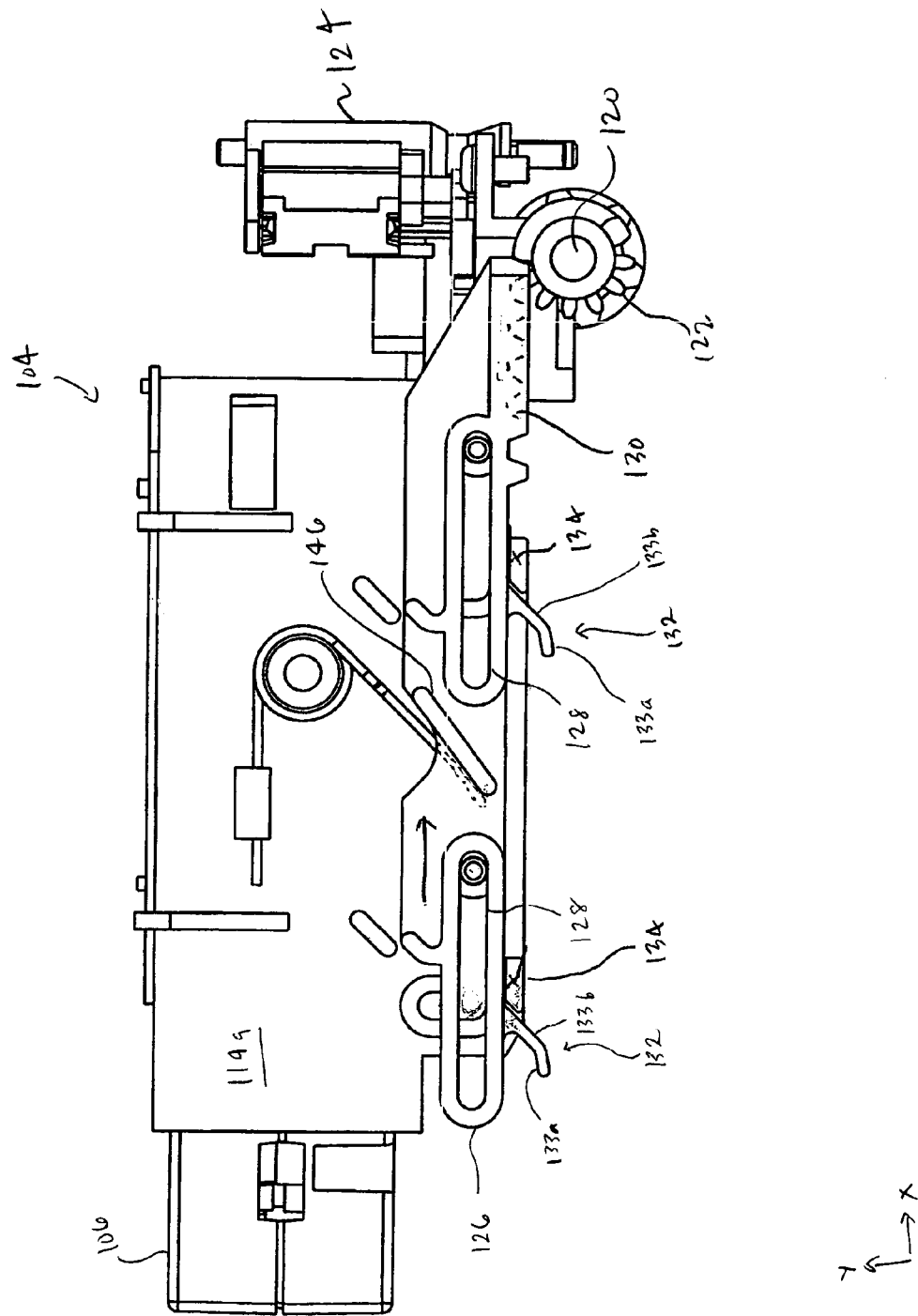
FIGS. 4A-4C are side views of the operation of an actuator and a receiver in accordance with embodiments of the present invention.

FIG. 4A is a side view of components of the tape drive 100 similar to FIG. 2, but further depicting the actuator 126. The actuator 126 is positioned adjacent to the side wall 114a of the receiver 104 and is provided with a pair of actuator guide slots 128. The actuator guide slots 128 also mate with the same guide pins 118 as the receiver 104. The actuator guide slots 128 are shaped as linear slots such that the actuator 126 is limited to traveling in the horizontal direction. The actuator 126 includes actuator gears 130, which mate with drive shaft gears 122 such that rotation of the drive shaft 120 causes linear translation of the actuator 126. The actuator 126 is also provided with a pair of cams 132 which are configured to abut a pair of receiver projections 134 which extend from the receiver 104. A second identical actuator 126 may be provided adjacent to the opposing side wall 114b.

As used herein, the terms "horizontal" and "vertical" refer to relative directions based upon the orientation of the tape cartridge 106 when the tape cartridge 106 is fully loaded into the tape drive 100. The "vertical" direction is defined as the direction of the axis of rotation of the cartridge reel 107 in the tape cartridge 106, while the "horizontal" direction is orthogonal to the "vertical" direction As shown in FIG. 4A, the "horizontal" direction is indicated by the x-axis and the "vertical" direction is indicated by the y-axis. It will be understood that in some storage systems, the tape drive 100 may be mounted on its side such that the "vertical" direction as defined herein by the axis of the cartridge reel 107 is parallel to the horizon (i.e., the tape cartridge 106 is inserted into the tape drive 100 such that the thin side of the tape cartridge 106 is parallel to the floor of the room in which the storage system is provided). In addition, the term "forward" is used herein to refer to the direction of travel which the tape cartridge 106 follows in the horizontal direction when being loaded into the tape drive 100. Similarly, the term "backward" refers to the horizontal direction of travel of the tape cartridge 106 during ejection (i.e., the direction opposite the "forward" direction).

Figure 4B:
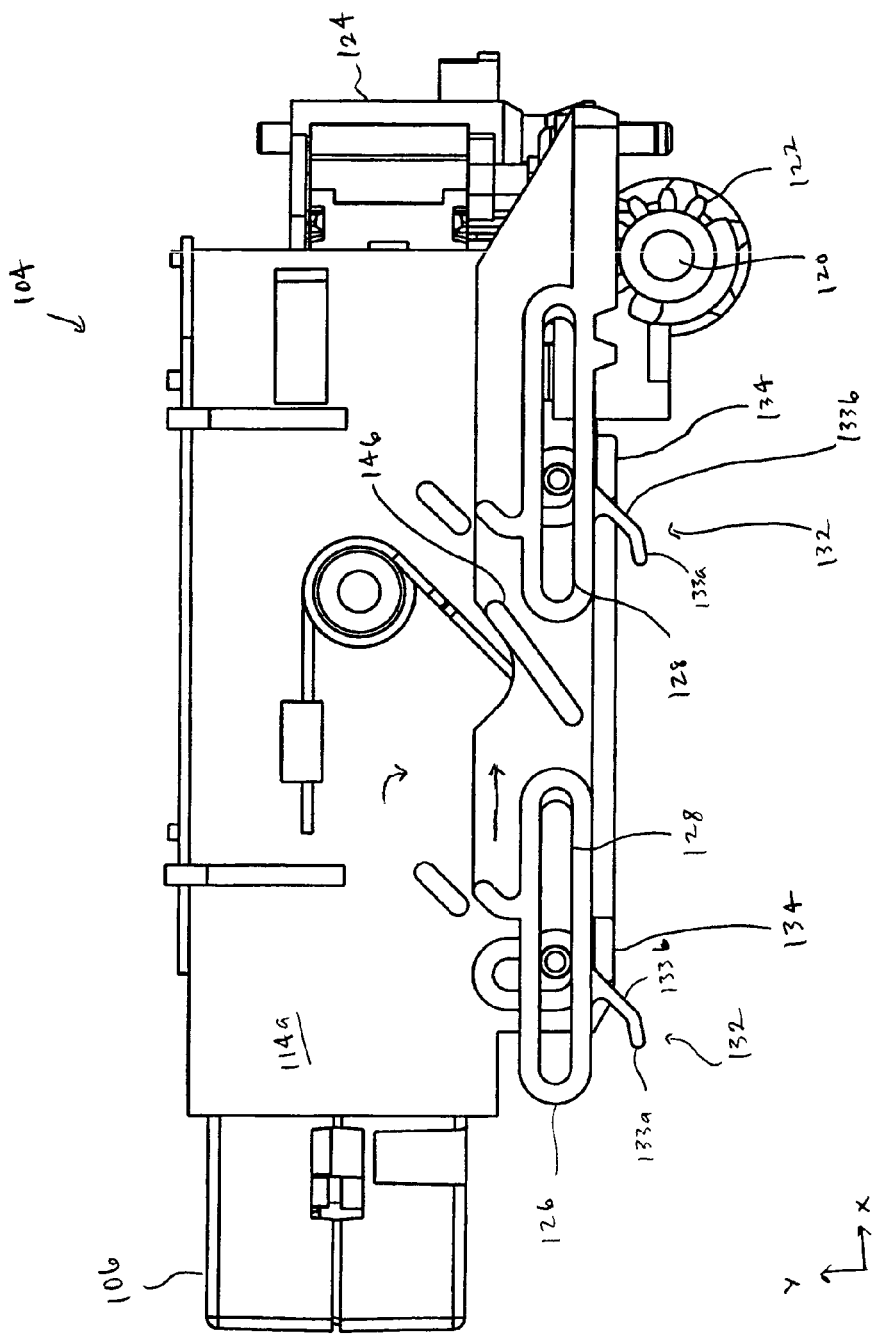
Figure 4C:
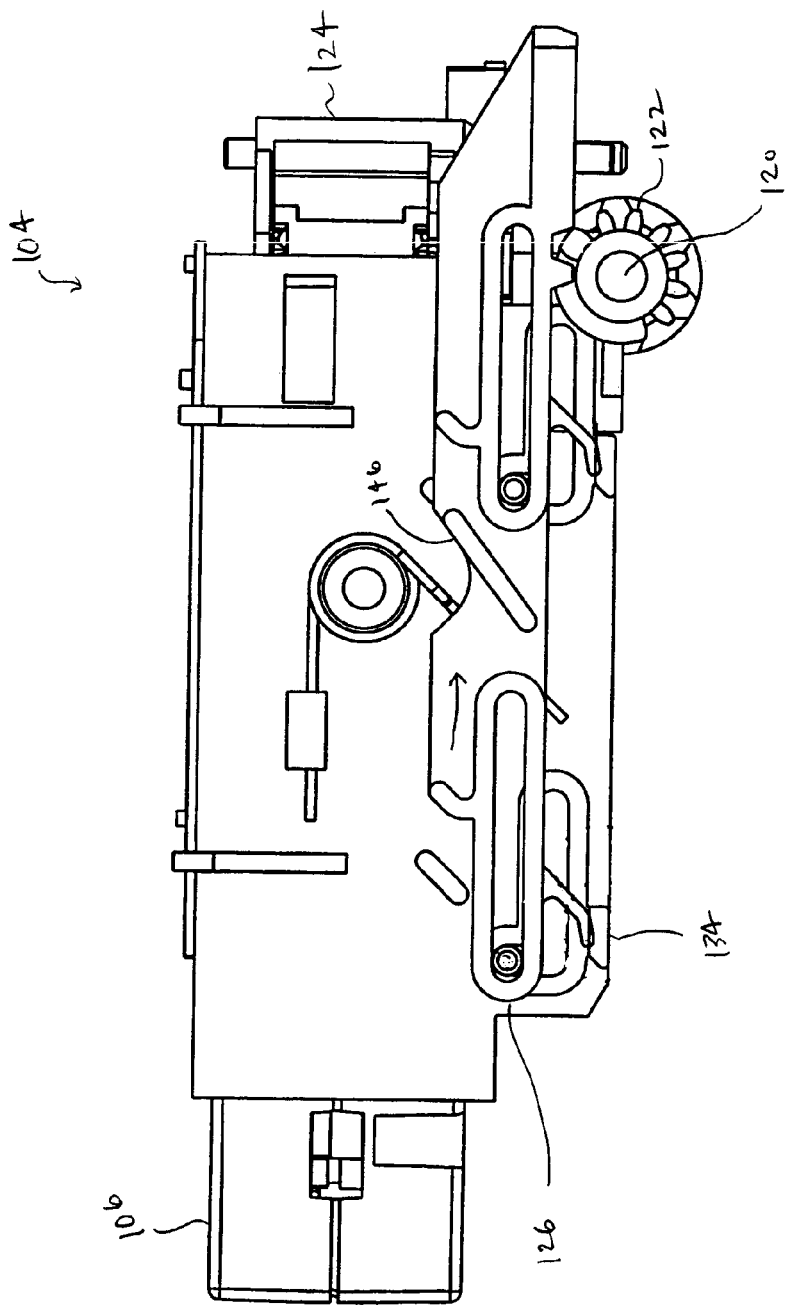

FIGS. 4A-4C illustrate the relative positions of the tape drive components during the tape cartridge loading process. In FIG. 4A, the tape cartridge 106 has been inserted into the tape drive 100 (by, for example, a robotic picker arm of a tape library storage system), yet remains in the ejected position. In this ejected position, the receiver 104 is positioned such that the guide pins 118 are located at the front ends of the guide slots 116 of the receiver 104, as shown in FIG. 2. In addition, the actuator 126 is positioned such that the guide pins 118 are also located at the front ends of the actuator guide slots 128.

During loading, the drive shaft 120 is rotated by a drive shaft gear 136 (shown in FIG. 7A), which is rotated by a drive shaft motor (not shown), thereby causing the drive shaft gears 122 to engage the actuator gears 130. The stationary guide pins 118 cooperate with the actuator guide slots 128 to prevent vertical movement, allowing the actuator 126 to move only forward and backward in the horizontal direction. Therefore, as the drive shaft gears 122 engage the actuator gears 130, the actuator 126 is moved in the forward direction. As shown in FIG. 4A, the drive shaft 120 rotates in the clockwise direction, which moves the actuator 126 to the right.

The guide slots 116 on the receiver 104 are formed such that each guide slot 116 has a first portion 117a which enables the receiver 104 to travel along the guide pins 118 in a first direction, and a second portion 117b which enables the receiver 104 to travel along the guide pins 118 in a second direction different from the first direction. As can be seen in FIG. 2, the guide slots 116 on the receiver 104 are formed in an L-shape in which the first portion 117a of the guide slot 116 enables the receiver 104 to move only in the horizontal direction and the second portion 117b allows only vertical movement. Accordingly, at the beginning of the loading process (when the guide pins 118 are located in the first portions 117a), the receiver 104 is capable of only horizontal movement.

As the actuator 126 is moved forward by the drive shaft gears 122, the cams 132 on the actuator 126 apply a force onto the receiver projections 134. In the embodiment shown, the cams 132 have a ramp-like shape such that both horizontal and vertical forces are applied onto the receiver projections 134 simultaneously (i.e., the cams 132 push the receiver projections 134 both forward and downward). However, due to the shape of the first portion 117a of the guide slots 116, the receiver 104 at the initial loading stages is capable of only horizontal movement. Thus, the force of the cams 132 upon the receiver projections 134 cause the receiver 104 to travel in the forward direction along with the actuator 126. As this forward movement of both the receiver 104 and the actuator 126 proceeds, the receiver projections 134 remain in static contact with the cams 132.

FIG. 4B shows the position of the receiver 104 and the actuator 126 after receiver 104 has traveled the desired distance in the horizontal direction. Here, the guide pins 118 have traveled the entire length of the first portions 117a of the guide slots 116. When the guide pin 118 is located at the junction of the first portion 117a and the second portion 117b of the guide slot 116, the receiver 104 can move in only two possible directions: the receiver 104 can move backward in the horizontal direction such that the guide pin 118 travels back along the first portion 117a, or the receiver 104 can move downward in the vertical direction such that guide pin 118 begins traveling along the second portion 117b. At this midway point, the actuator cams 132 continue applying both a forward and downward force upon the receiver projections 134. Due to the constraints caused by the shape of the guide slots 116, continued forward movement of the receiver 104 is not possible. Therefore, as the actuator 126 continues moving horizontally forward, the receiver 104 begins to move vertically downward such that the guide pins 118 begin traveling along the second portions 117b of the guide slots 116. Because the receiver 104 is no longer moving forward with the actuator 126, the receiver projections 134 are no longer in static contact with the cams 132. Instead, as this downward movement proceeds, the receiver projections 134 begin sliding downward along the length of the cams 132.

As the receiver 104 moves downward, the cartridge reel 107 in the tape cartridge 106 travels downward to be coupled with the reel driver 110 of the tape drive 100. FIG. 4C shows the position of the receiver 104 and the actuator 126 after the actuator 126 has completed its forward movement. At this point, the receiver projections 134 are positioned at the ends of the cams 132. In addition, the guide pins 118 are located at the ends of the actuator guide slots 118 and the ends of the second portions 117b of the receiver guide slots 116. The receiver 104 is now in the fully loaded position within the tape drive 100 and the cartridge reel 107 in the tape cartridge 106 is fully coupled with the reel driver 110.

In accordance with aspects of the present invention, the cams 132 may comprise two portions: an end portion 133a and a beginning portion 133b. The beginning portion 133b may have a steep angle, to provide course and rapid vertical motion of the receiver 104 during the initial downward movement stage. The end portion 133a may have a slight angle, to provide slower vertical motion of the receiver 104 during the final stages of downward movement. In addition, the end portion 133a may be formed such that the ends 133a of the ramp-like cams 132 are flexible, to provide a constant spring-like downward force upon the receiver projections 134 after the receiver 104 has reached the fully loaded position. This spring-like downward force can help to clamp the receiver 104 in the loaded position and accommodate minor variations in the tolerances of the loading assembly.

Figure 13:
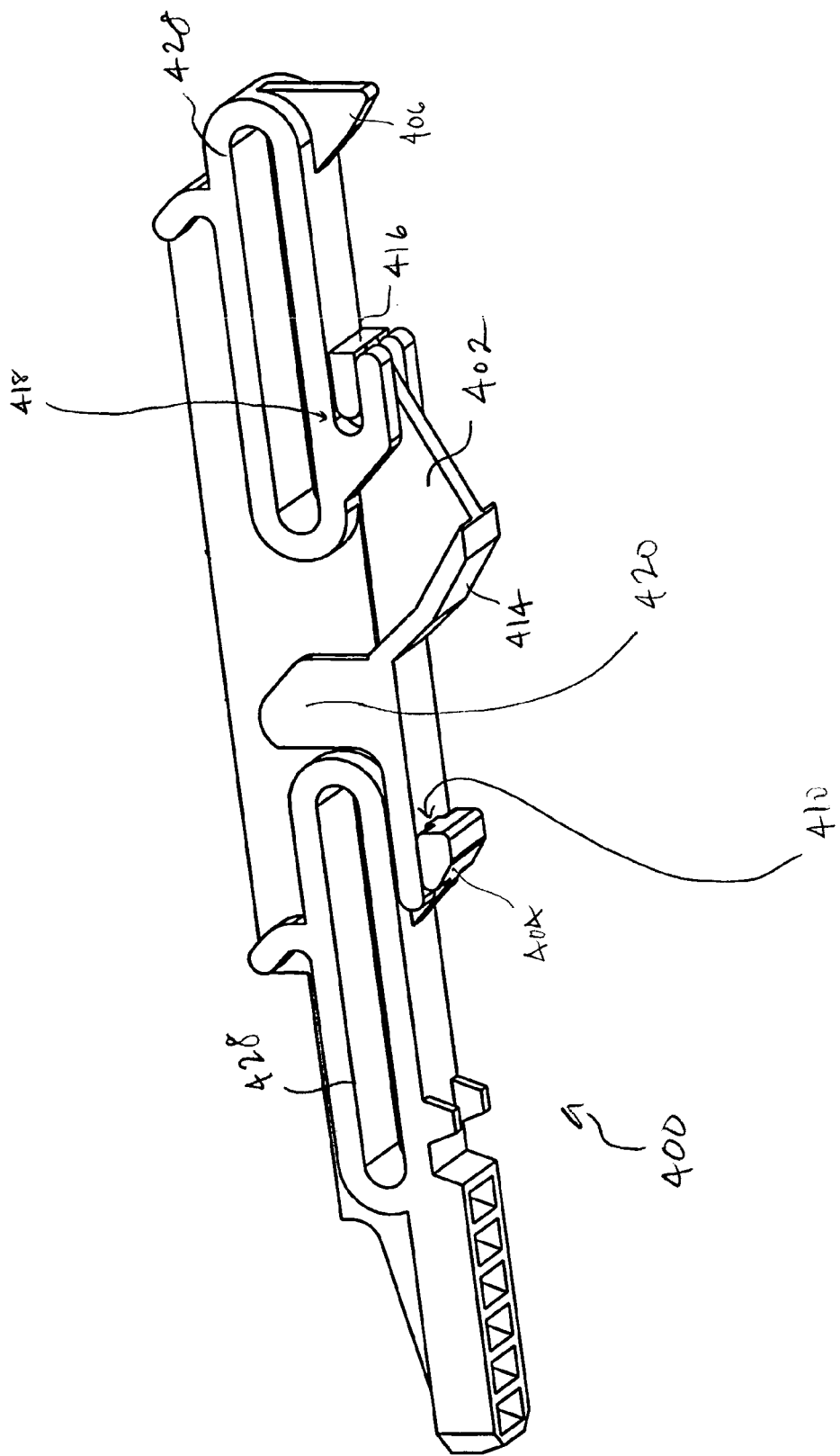
FIG. 13 shows an alternative version of an actuator in accordance with embodiments of the present invention.

FIG. 13 shows an alternative design for an actuator 400, in accordance with other embodiments of the present invention. The actuator 400 comprises an actuator body 401 and a clamp 402, which is slidably coupled to the actuator body 401.

Figure 14:
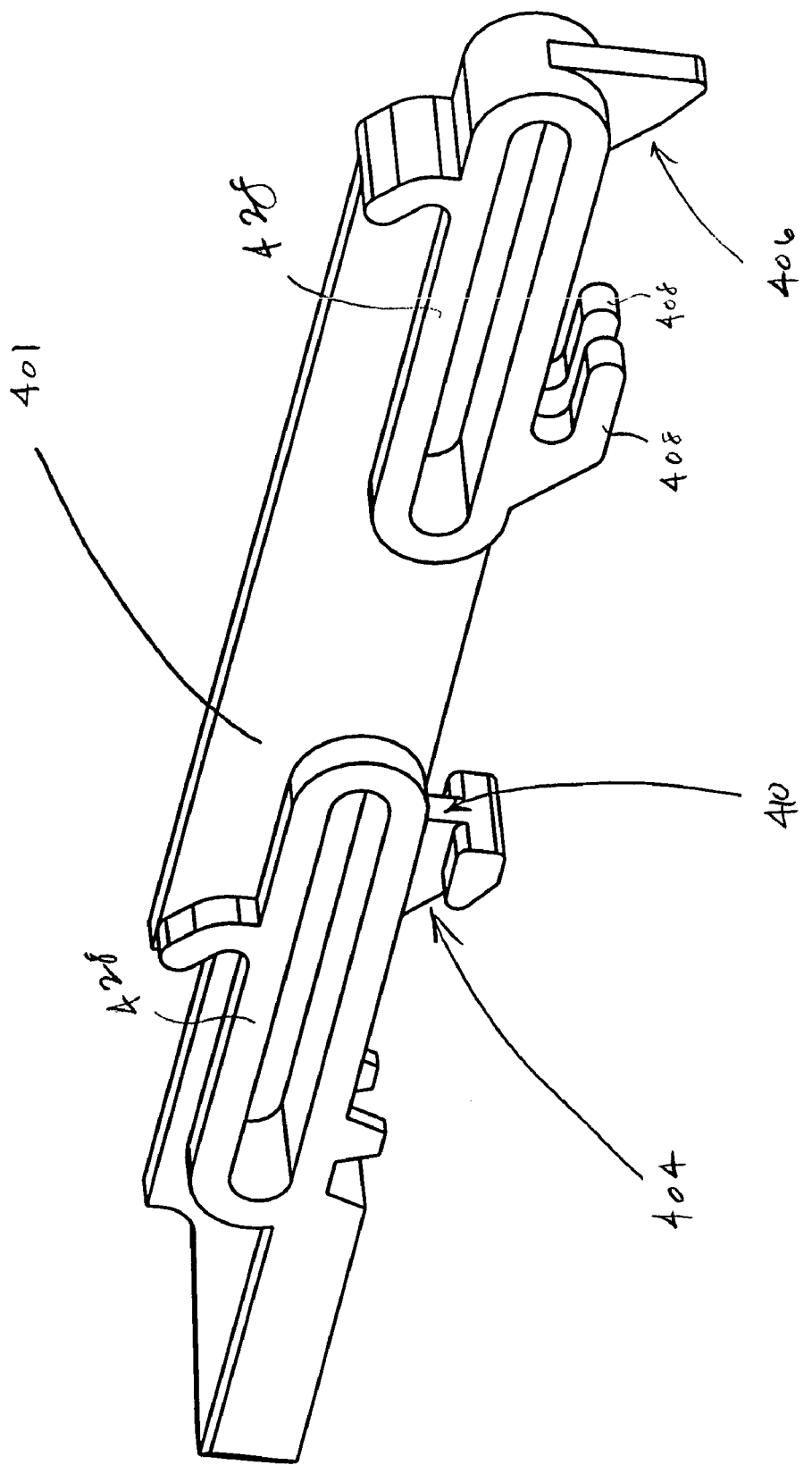
FIG. 14 shows an actuator body in accordance with embodiments of the present invention.

FIG. 14 shows the actuator body 401 with the clamp 402 removed. The actuator body 401 includes a first cam 404, a second cam 406, and a pair of clamp flanges 408. The back side of the first cam 404 forms a clamp stop 410. The actuator body 401 also includes a pair of actuator guide slots 428, similar to the actuator guide slots 128 described above, which enable the actuator body 401 to travel forward and rearward in the horizontal direction only.

FIG. 15 shows an embodiment of the clamp 402. The clamp 402 includes a clamp slot 412, a third cam 414, a rear fin 416, and a pair of spring flanges 420. When the clamp 402 is coupled with the actuator body 401, as shown in FIG. 13, the spring flanges 420 straddle the actuator body 401, the clamp stop 410 of the actuator body 401 is inserted into the clamp slot 412 of the clamp 402, and the rear fin 416 is received between the pair of clamp flanges 408. The clamp stop 410 and the clamp flanges 408 are positioned such that a gap 418 is provided between the front of the rear fin 416 and the back of the clamp flanges 408. This gap 418 enables the clamp 402 to be securely coupled to the actuator body 401 while being able to slide back and forth slightly in the horizontal direction between the clamp stop 410 and the back of the clamp flanges 408.

Figure 16A:
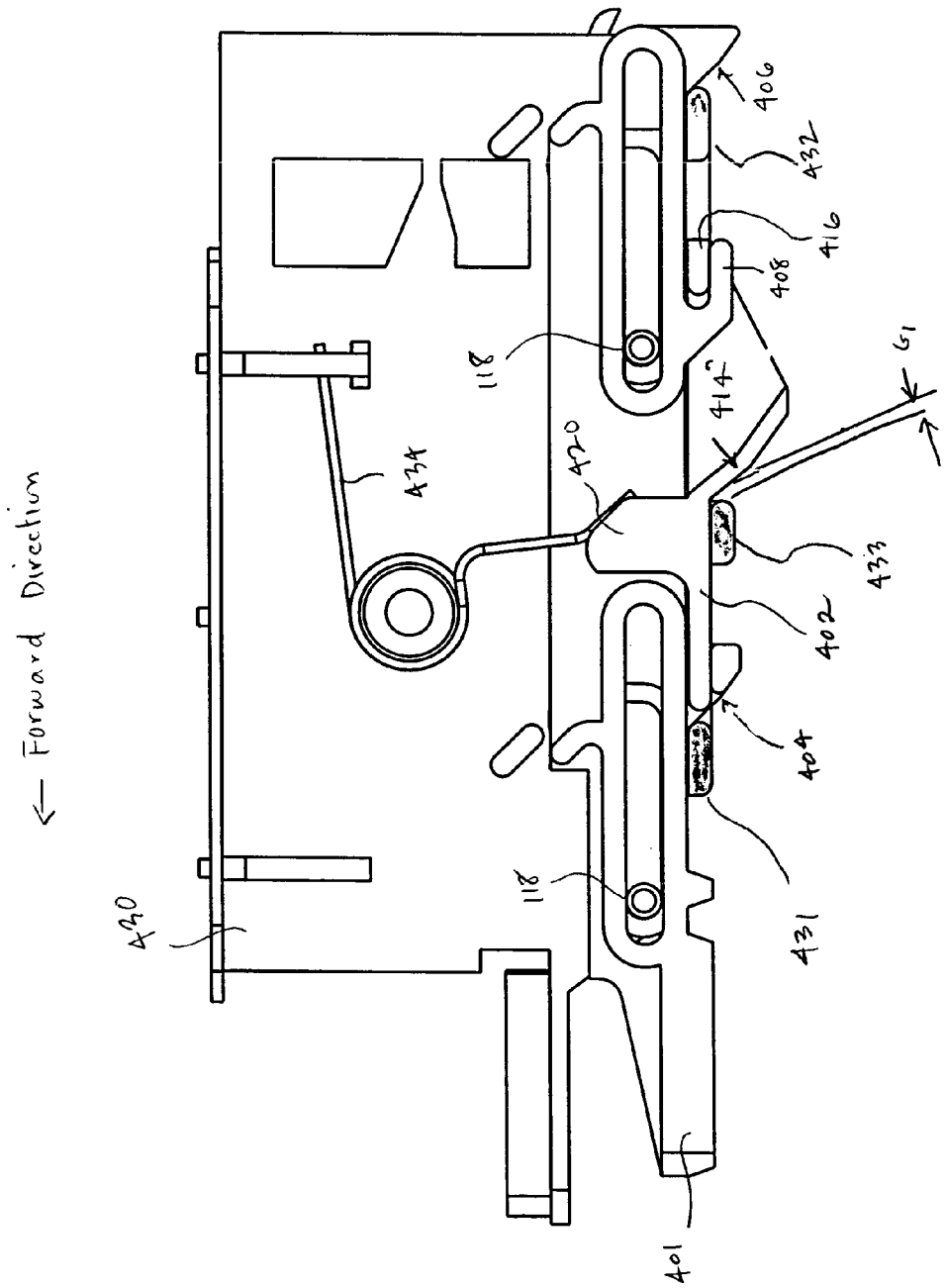

FIG. 16A shows the position of the actuator body 401, the clamp 402, and the receiver 430 when the receiver 430 is in the ejected position. Each side wall of the receiver 430 includes a pair of guide slots 116 which mate with a pair of guide pins 118 provided on the tape drive body, as described above with respect to FIGS. 1-8. The receiver 430 includes a first receiver projection 431 which is configured to abut first cam 404, a second receiver projection 432, which is configured to abut second cam 406, and a third receiver projection 433, which is configured to abut third cam 414. A torsion spring 434 may be provided for applying a forward and downward bias against the clamp 402, such that the clamp 402 is pushed forward until the clamp stop 410 is pressed against the clamp slot end 413.

FIG. 17A is a magnified view of the positioning of the actuator body 401, the clamp 402, and the receiver 430, when the receiver 430 is in the ejected position, as shown in FIG. 16A. The projections 431-433 are positioned such that the first projection 431 and the second projection 432 abut their respective cams 404, 406, but the third projection 433 is separated from the third cam 414 by a gap $G_1$. The torsion spring 434 may also supply an upward force onto the receiver 430 to support the receiver 430 and ensure that the first and second receiver projections 431-432 remain pressed firmly against the first and second cams 404, 406 during the loading process.

As described above with respect to FIGS. 4A-4B, as the actuator 400 moves forward, the first and second cams 404, 406 press on the first and second projections 431-432 to propel the receiver 430 to move forward together with the actuator 400. While the actuator 400 and the receiver 430 are simultaneously traveling forward, the third projection 433 remains separated from the third cam 414 by the gap $G_1$. After the receiver 430 has traveled the complete horizontal distance permitted by its receiver guide slots 116, the receiver 430 can no longer travel with the actuator 400 as the actuator 400 continues moving forward. As a result, the first and second receiver projections 431-432 begin sliding down the ramp-like first and second cams 404, 406, thereby driving the receiver 430 downward.

As the receiver 430 begins to reach the end of the downward travel permitted by its guide slots 116, the first and second receiver projections 431-432 begin to reach the end of the ramp-like cams 404, 406. After the first and second receiver projections 431-432 reach the end of the ramp-like cams 404, 406, the cams 404, 406 begin sliding along the top surface of the first and second receiver projections 431-432, as shown in FIG. 16B. For a brief period of time, the actuator body 401 continues to move forward, while the receiver 430 remains stationary. During this time, the third projection 433 begins to move closer to the third cam 414, reducing the size of the separation gap $G_1$.

FIG. 17B shows the positions of the actuator body 401, the clamp 402, and the receiver 430, after the receiver 430 has completed the loading process and is fully lowered onto the reel driver 110. In the system described above with reference to FIG. 4C, the cams 132 have flexible end portions 133, which provide an interference fit to firmly retain receiver 104 in the loaded position. In the system shown in FIG. 17B, the receiver 430 is firmly retained in the loaded position by the contact between the third projection 433 and the third cam 414.

With the receiver 430 in the loaded position, the torsion spring 434 applies a forward force onto one of the spring flanges 420, thereby urging the clamp 402 forward. Forward movement of the clamp 402 causes the third cam 414 to push the third cam 433 downward, thereby providing the force to retain the receiver 430 in the loaded position. Thus, the third cam 414 acts as a wedge. Because this downward retaining force is applied by the third cam 414 only after the receiver 430 has traveled to the loading position, the downward retaining force does not impact the force required to move the actuators 400 forward. In addition, because the clamp 402 is sized such that it may slide back and forth a small distance between the clamp stop 410 and the back of the clamp flanges 408, the wedge-like force applied by the third cam 414 can be provided despite small dimensional variations. For example, as shown in FIG. 17B, when the receiver 430 is fully loaded and the third cam 414 is wedged against third projection 433, the clamp 402 has moved rearward slightly, thereby creating a second gap, $G_2$, between the clamp slot end 413 and the clamp stop 410. In addition, there still remains a third gap, $G_3$, between the rear fin 416 and the back of the flanges 408. These gaps $G_2$ and $G_3$ enable the clamp 402 to move slightly relative to the actuator body 401, while maintaining the downward retaining force onto the third projection 433.

In accordance with other embodiments of the present invention, a torsion spring 140 may be provided for maintaining an appropriate bias between the receiver 104 each of the actuators 126 on either side of the receiver 104. A spring boss 142 upon which the torsion spring 140 is mounted is molded onto each side wall 114a-114b of the receiver 104. A first arm 144 of the torsion spring is fixedly retained in a spring flange 146, also provided on the receiver 104. A second arm 148 of the torsion spring 140 contacts a spring platform 150 provided on each actuator 126.

FIG. 5A shows the arrangement of torsion spring 140 when the receiver 104 is in the ejected position. At this point, the second arm 148 of the torsion spring 140 contacts the spring platform 150 at contact point 152, which is located at a distance $d_1$ from the axis of rotation of the torsion spring 140. The torsion spring 140 imparts a force upon the actuator 126 at contact point 152. The force that is imparted by torsion spring 140 is a function of wire diameter, coil diameter, the number of coils, the degrees of rotation α from free position, and the distance d of the contact point from the spring rotation axis. In addition, the direction of force imparted by torsion spring 140 depends upon the angle of contact between the second arm 148 and the spring platform 150.

The loading process described above with respect to FIGS. 4A-4C may be characterized in terms of four loading stages. First, the actuator 126 and the receiver 104 travel together in the forward horizontal direction. During this stage, the actuator 126 and the receiver 104 do not move relative to each other, and, accordingly, the force imparted by the torsion spring 140 does not vary and does not affect the load upon drive shaft motor 136. The torsion spring 140 may assist in maintaining firm contact between the actuator cams 132 and the receiver projections 134.

Figure 5B:
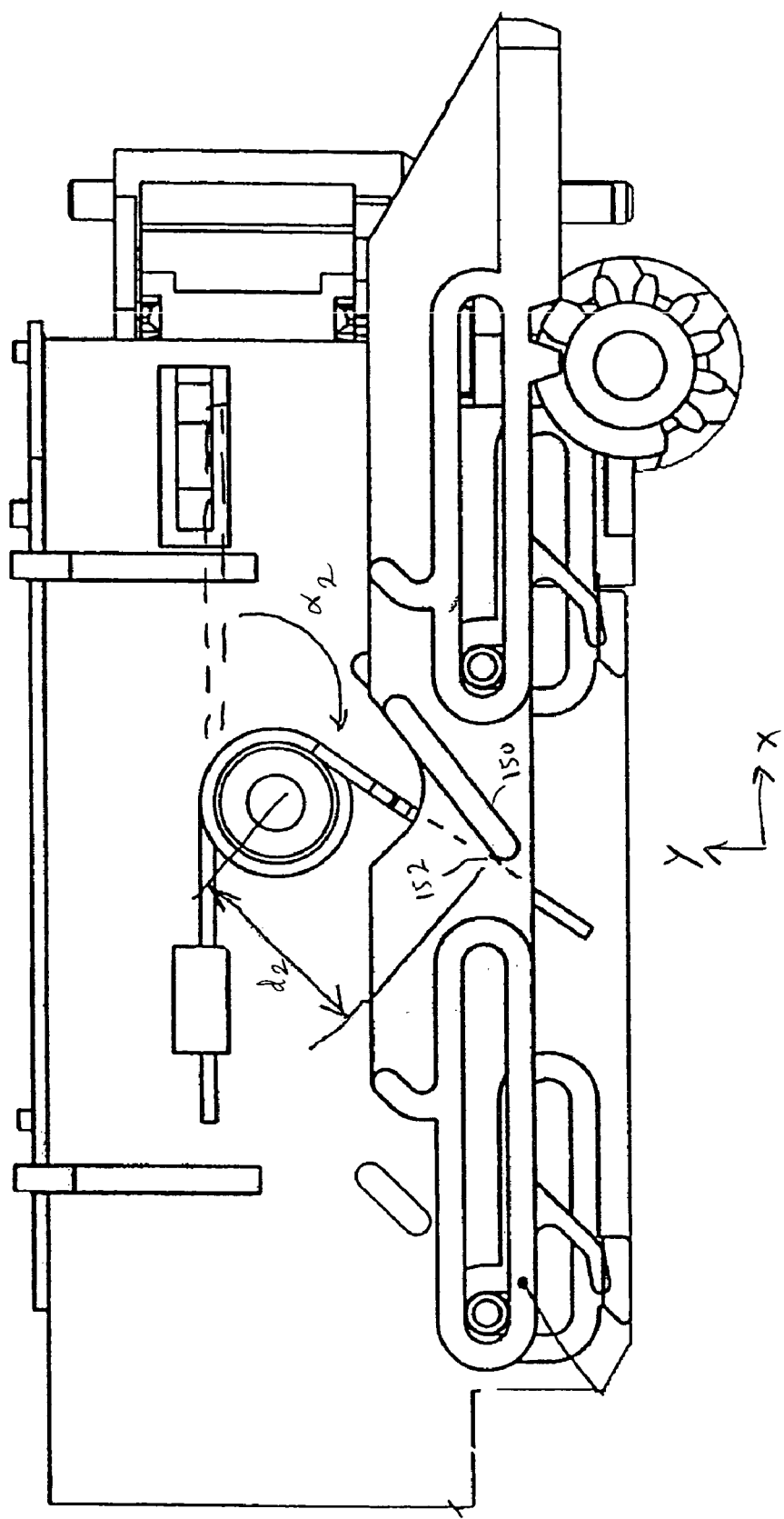

During the second loading stage, the actuator 126 continues to move forward, but the receiver 104 ceases horizontal movement and begins to move downward. The differing directions of movement causes the actuator 126 and the receiver 104 to move relative to each other, thereby causing the contact point 152 with the spring platform 150 to travel upward along the second arm 148 to a distance $d_2$ from the spring axis, as shown in FIG. 5B. In addition, the torsion spring 140 uncoils slightly such that the degrees of rotation from the free position has decreased from angle $α_1$, as shown in FIG. 5A, to angle $α_2$, as shown in FIG. 5B. It may be desired to select the spring characteristics such that the increase in force applied by the torsion spring 140 caused by the decrease in distance d is exactly or approximately offset by the decrease in force caused by the decrease in rotation angle a and the change in contact angle between the arm 148 and the platform 150.

The third loading stage begins when the cartridge reel 107 of the tape cartridge 106 contacts the reel driver 110 of the tape drive 100. At this point, the actuator 126 is continuing in a forward movement while the receiver 104 is continuing in a downward movement as in the second loading stage. However, a cartridge spring provided inside of the tape cartridge 106 provides a downward force onto the cartridge reel 107 in order to ensure secure connection between the cartridge reel 107 and the reel driver 110. This downward force applied by the cartridge spring opposes the downward movement of the receiver 104, and therefore would increase the load upon the drive shaft motor 136. The torsion spring characteristics can be selected to exactly or approximately offset the force applied by the cartridge spring, to minimize the overall change in load upon the drive shaft motor 136.

Finally, the fourth loading stage begins when the receiver 104 has completed its downward travel, but the actuator 126 continues its forward movement in order for the spring-like cams 132 to fully clamp down upon the receiver projections 134. This clamping force would ordinarily increase the load upon the drive shaft motor 136. However, the torsion spring characteristics can again be selected to exactly or approximately offset the extra load that would have been applied to the motor 136.

Thus, in accordance with embodiments of the present invention, a spring can be selected to provide a relative force between the receiver 104 and the actuators 126 such that any changes in the load upon the drive shaft motor 136 occurring during various stages of the loading process can be offset by changes in the spring force.

Figure 6:
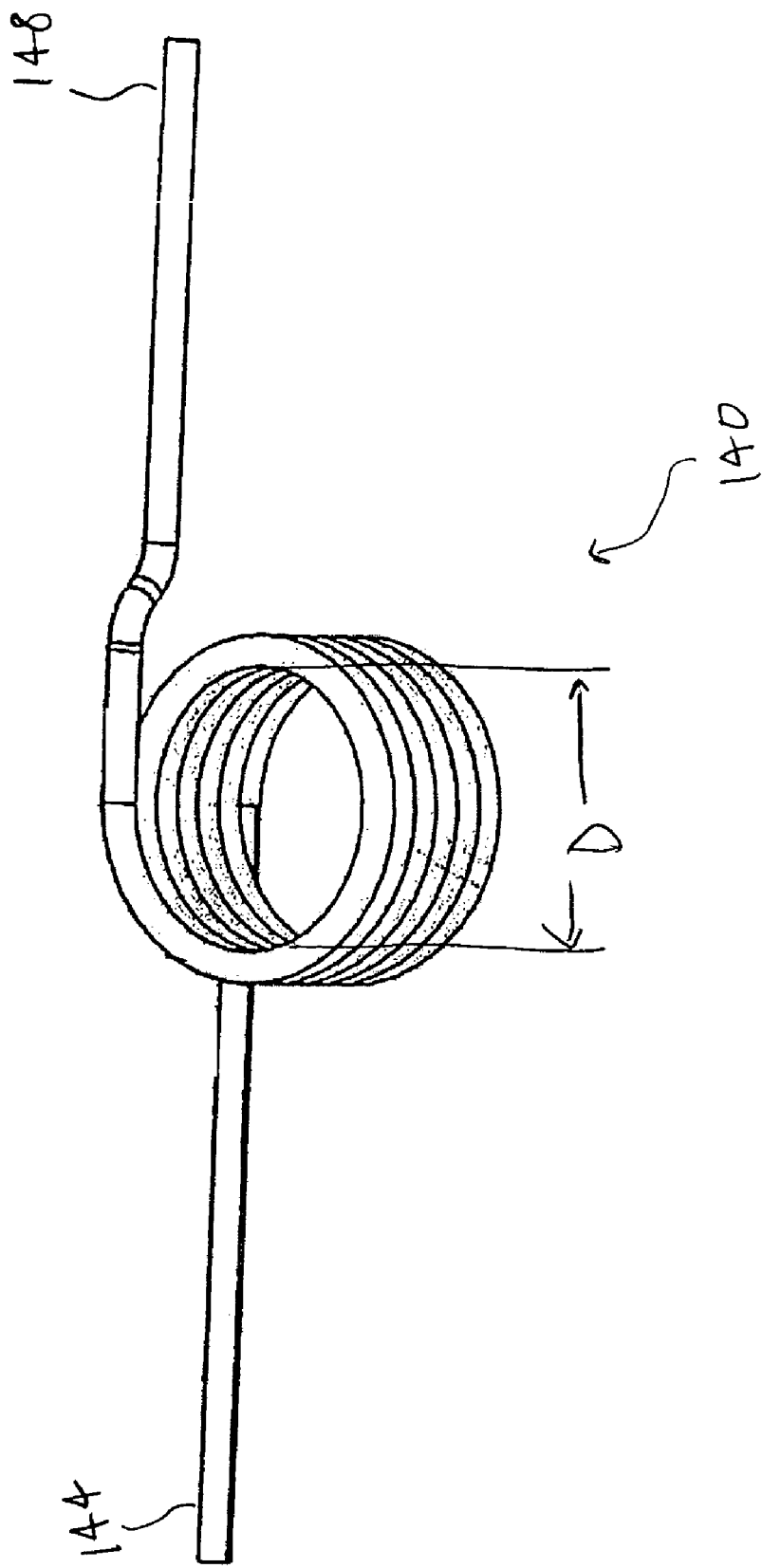
FIG. 6 shows a torsion spring in accordance with embodiments of the present invention.

FIG. 6 shows an exemplary torsion spring 140 that may be used. This torsion spring 140 is formed of a steel wire having a wire diameter of 0.8 mm. The spring 140 is coiled six times about its axis of rotation, each coil having an internal coil diameter D equal to approximately 8.5 mm. In other embodiments, the spring dimensions, shape, and composition may vary.

In accordance with other embodiments of the present invention, a single drive shaft 120 separately provides power to move the actuator 126 and operate the buckler assembly 124. In addition, in some embodiments, it may also be advantageous to perform these two tasks sequentially, in order to decrease the maximum loads on the driving motor. This may be accomplished by providing the drive shaft 120 with drive shaft gears 122 that first engage actuator gears 130 to provide horizontal movement of the actuator 124 for a limited portion of the drive shaft's rotation, and then disengage from the actuator gears 130 to allow the drive shaft 120 to continue rotating without resulting in continued forward movement of the actuator 126.

FIGS. 7A-7D and 8A-8D are perspective drawings illustrating a partial gear engagement system for the drive shaft 120 in accordance with embodiments of the present invention. FIGS. 7A-7D are drawn using a perspective view opposite the perspective view shown in FIG. 1A. Accordingly, in FIG. 1A, the forward direction in which the tape cartridge 106 is loaded is from left to right, while in FIGS. 7A-7D, the forward direction in which the tape cartridge 106 is loaded is from right to left. FIGS. 8A-8D are magnified views of the drive shaft mating shown in FIGS. 7A-7D taken from a slightly different perspective.

Figure 7A:
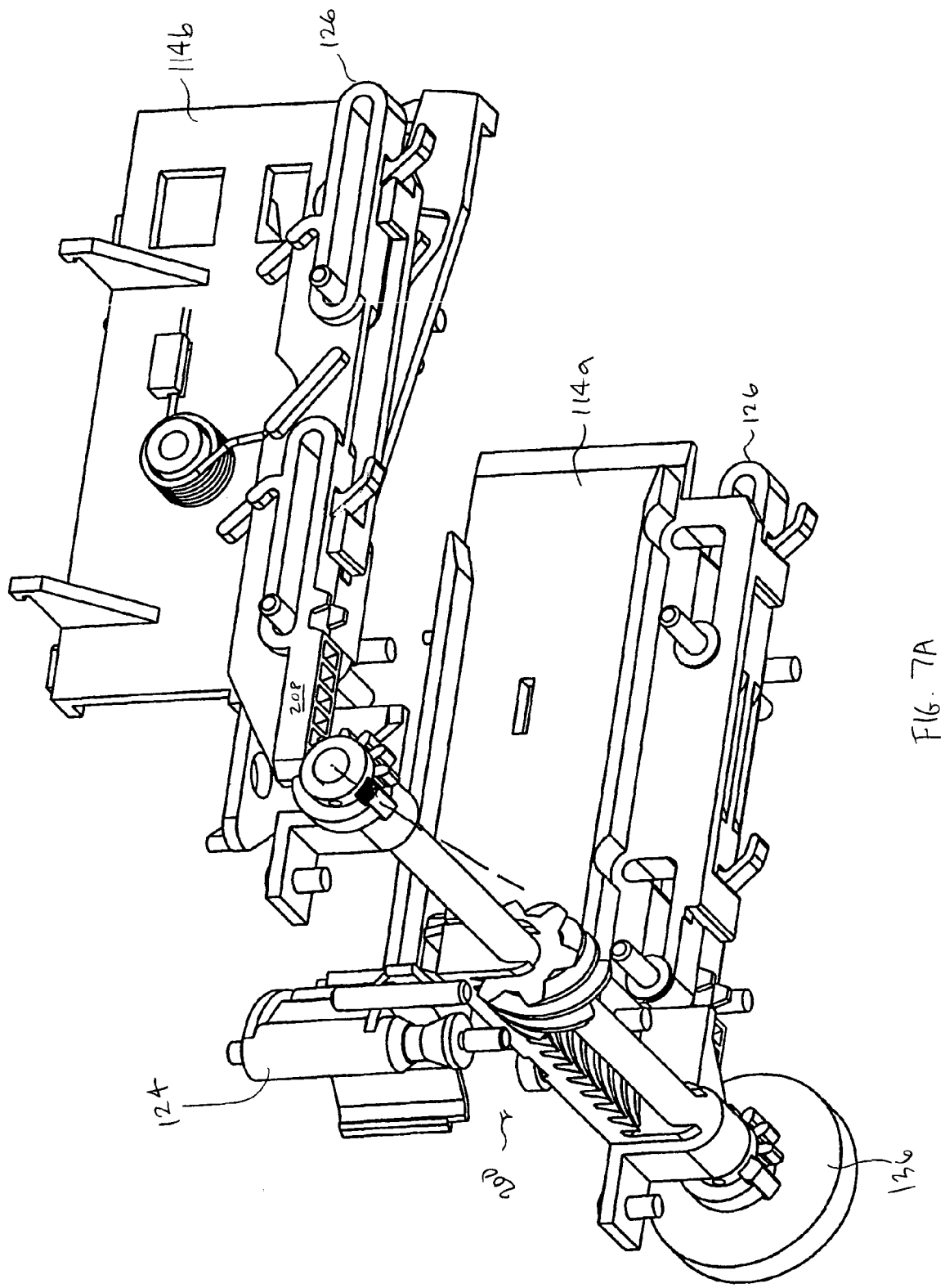
FIGS. 7A-7D show a drive shaft engaging an actuator in accordance with embodiments of the present invention.

FIG. 7A shows the drive shaft 120 engaging an actuator 126 at the beginning of the loading process (i.e., with the receiver 104 in the ejected position, as shown in FIG. 1A). The drive shaft gears 122 comprise a first set of gear teeth 202a-202f, followed by a synchronizer tooth 204, and a lateral stability cog 206. In the illustrated embodiment, the teeth 202a-202f are provided on approximately half of the circumference of the drive shaft 120. The actuator gears 130 comprise a first gearing portion 208, followed by a synchronizer gap 210, and pair of synchronizer flanges 212. This is shown in greater detail in FIG. 8A.

Figure 7B:
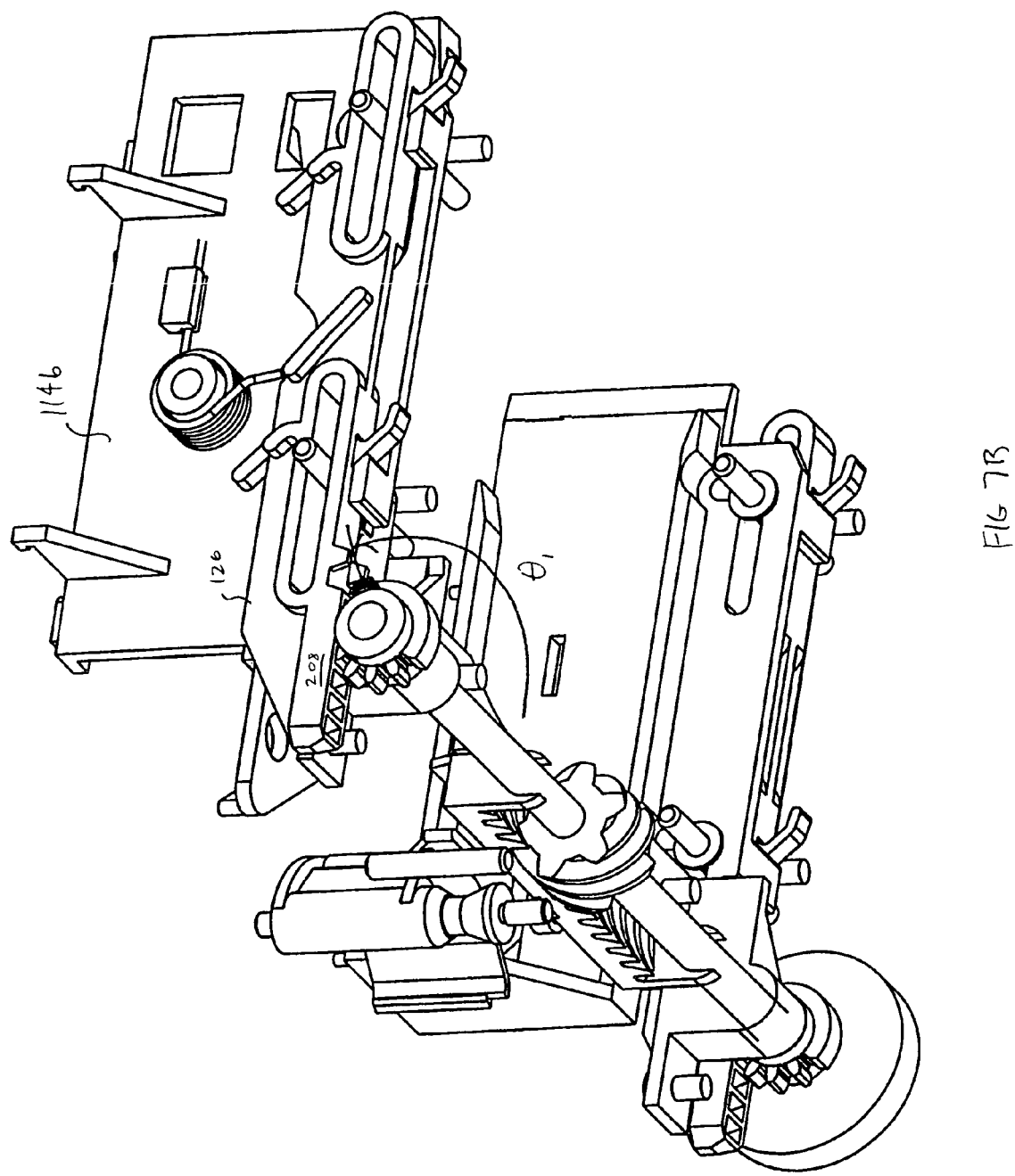

At the point shown in FIGS. 7A and 8A, the first gear tooth 202a of the drive shaft gears 122 is starting to couple with the beginning of the first gearing portion 208. As the drive shaft 120 continues to rotate through a first rotational distance of $θ_1$ (shown in FIG. 7B), the actuator 126 is driven in a linear horizontal direction, and subsequent gear teeth 202b-202f of the drive shaft gears 122 sequentially mate with the first gearing portion 208. After the last tooth 202f is a synchronizer tooth 204, which is received into synchronizer gap 210 and contacts the end of the first gearing portion 208. This is shown in FIGS. 7B and 8B. As the drive shaft 120 continues to rotate from this point of initial contact through a second rotational distance $θ_2$ (as shown in FIG. 7C), the synchronizer tooth 204 is the only portion of the drive shaft gears 122 applying a horizontal motive force onto the actuator 126.

Figure 7C:
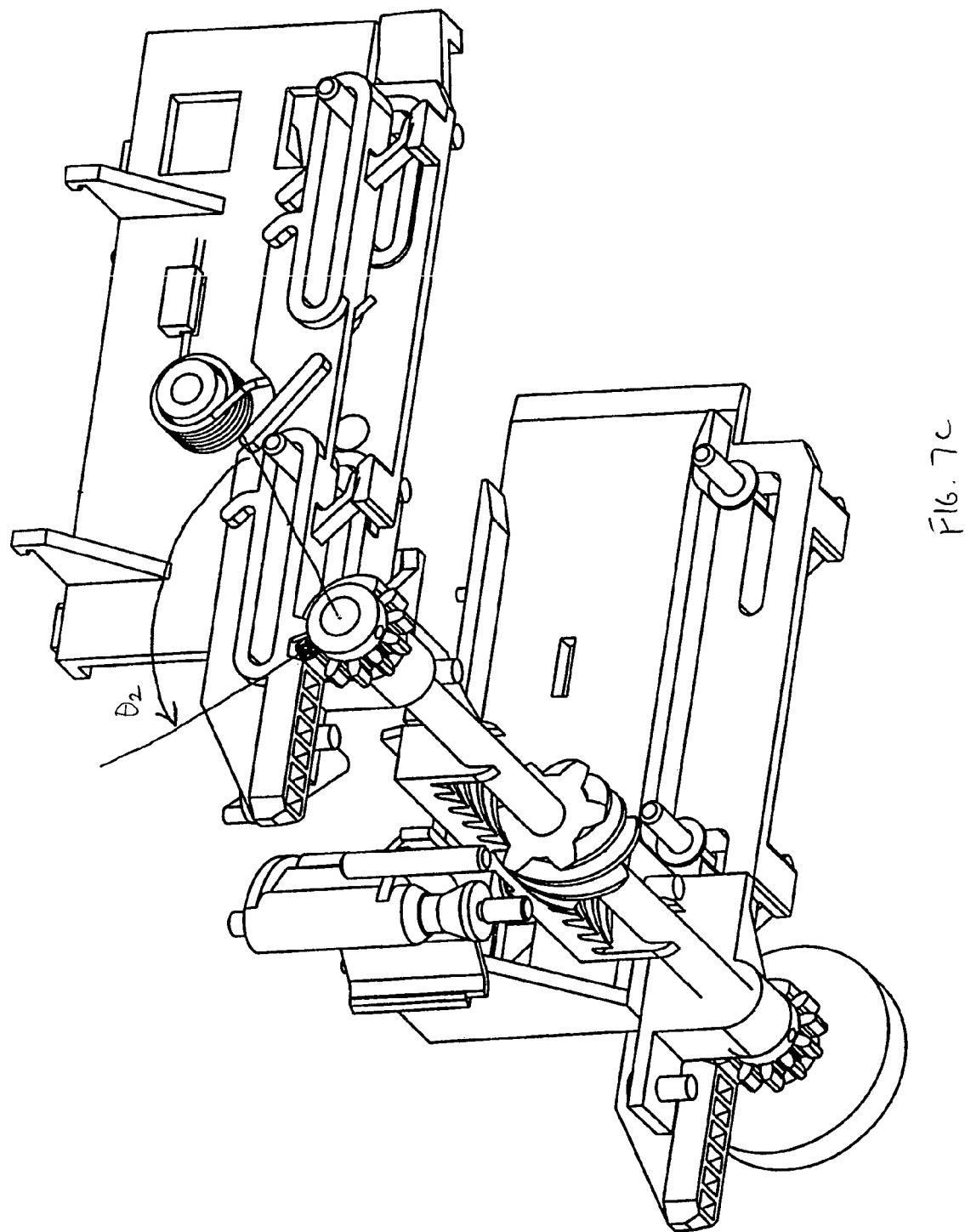

After the drive shaft 120 has completed its rotation through the second rotational distance $\theta_2$ (as shown in FIG. 7C), the actuator 126 will have completed its entire forward movement and the receiver 104 will have completed its entire forward and downward movements, resulting in the receiver 104 being in the fully loaded position. Because the receiver 104 has completed its loading process, the drive shaft 120 is no longer needed to power the loading mechanism. At this point, it may be desired to have the drive shaft 120 begin powering the buckling mechanism, as will be described in further detail below. Accordingly, a mechanism may be provided for disengaging the actuator 126 from the drive shaft 120, so that the drive shaft 120 can continue to be rotated by the drive shaft motor 136 in order to power the buckling process without causing any further movement of the actuator 126 or the receiver 104. By disengaging the actuator 126 from the drive shaft 120 before beginning the buckling process, the peak loads placed on the drive shaft motor 136 can be decreased, thereby enabling the use of a less expensive motor. In addition, if the actuator 126 were not disengaged from the drive shaft 120, the actuator 126 would continue traveling forward as the drive shaft 120 powers the buckling process. This continued forward travel would require that additional clearance be provided within the drive 102 to allow for the complete range of movement of the actuator 126. The disengaging of the actuator 126 may help to reduce the amount of clearance needed for the actuator movement.

The disengaging mechanism may be effectuated by the pair of synchronizer flanges 212. After the synchronizer tooth 204 is received into the synchronizer gap 208, the lateral stability cog 206 which follows the synchronizer tooth 204 has a width selected such that the cog 206 may be received between the pair of synchronizer flanges 212. After the drive shaft 120 has completed its rotation through the second rotational distance $\theta_2$, the synchronizer tooth 204 will have pushed the gearing portion 208 sufficiently far forward such that the lateral stability cog 206 will not contact the gearing portion 208 and, accordingly, will not apply a motive force to the actuator 126. The sides of the lateral stability cog 206 may contact the interior sides of the pair of synchronizer flanges 212 to inhibit undesired lateral movement of the actuator 126 without applying a force on the actuator 126 in the forward direction.

Figure 7D:
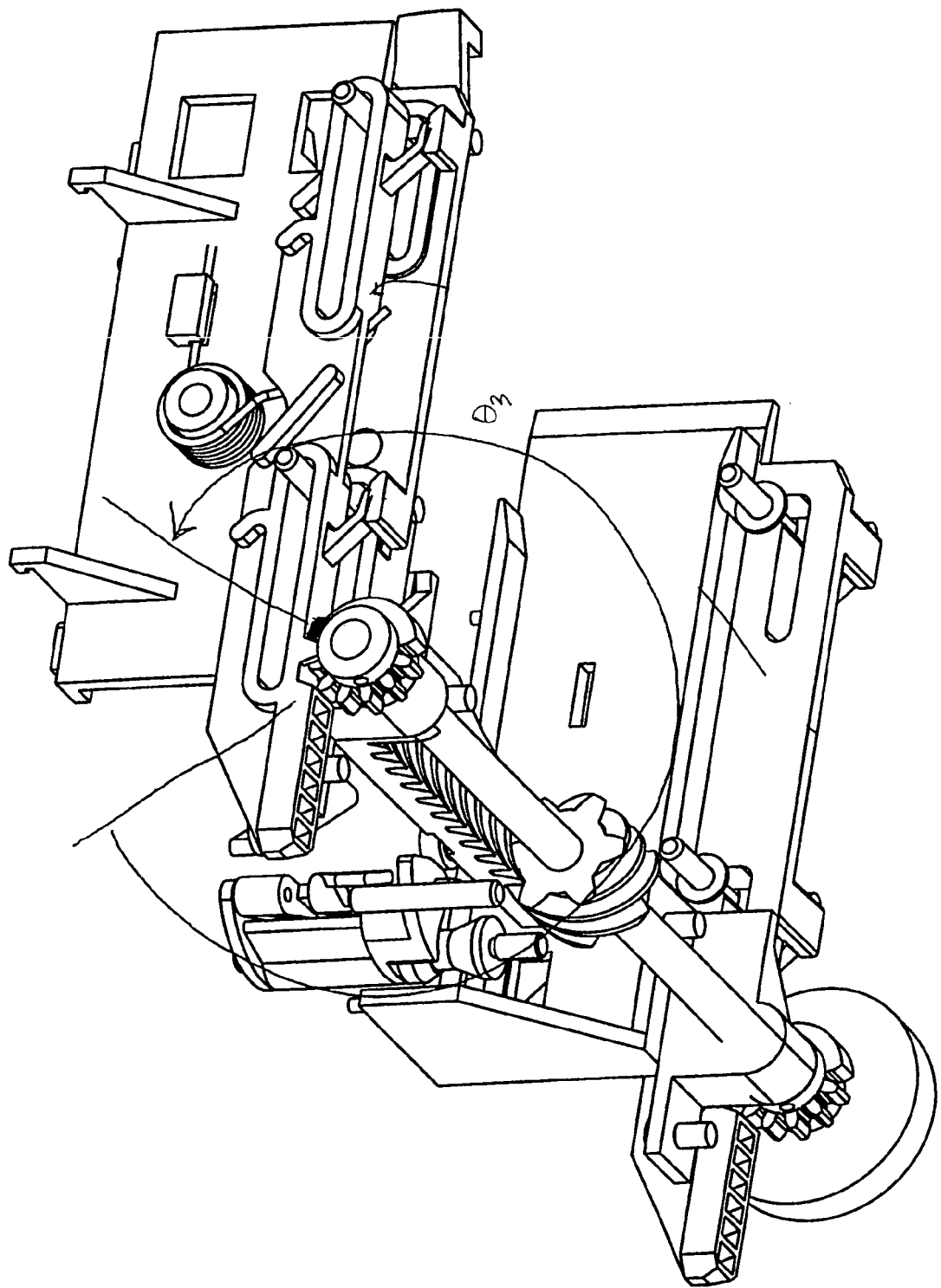

After drive shaft 120 has completed its rotation through the second rotational distance $\theta_2$, the drive shaft 120 continues rotating through a third rotational distance $\theta_3$ (shown in FIG. 7D). As the drive shaft 120 rotates through a third rotational distance $\theta_3$, first the lateral stability cog 206 and then the gear teeth 202a-202f (which have a width similar to the width of the lateral stability cog 206) pass between the pair of synchronizer flanges 212 without applying a forward force upon the actuator 126. During this rotation through the third rotational distance $\theta_3$, the drive shaft 120 can be used to power the buckler mechanism, as will be described in greater detail below.

Figure 8C:
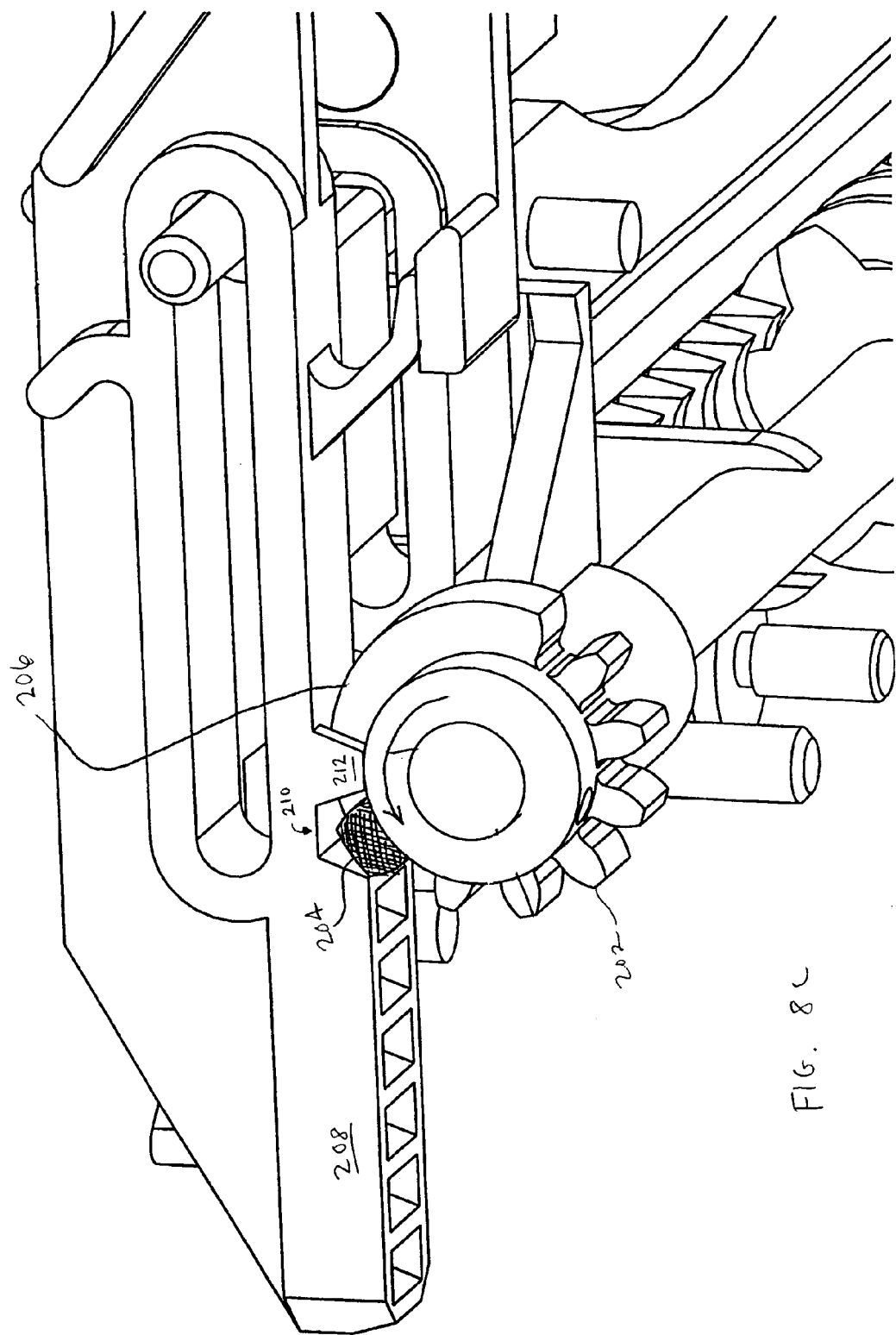
Figure 8D:
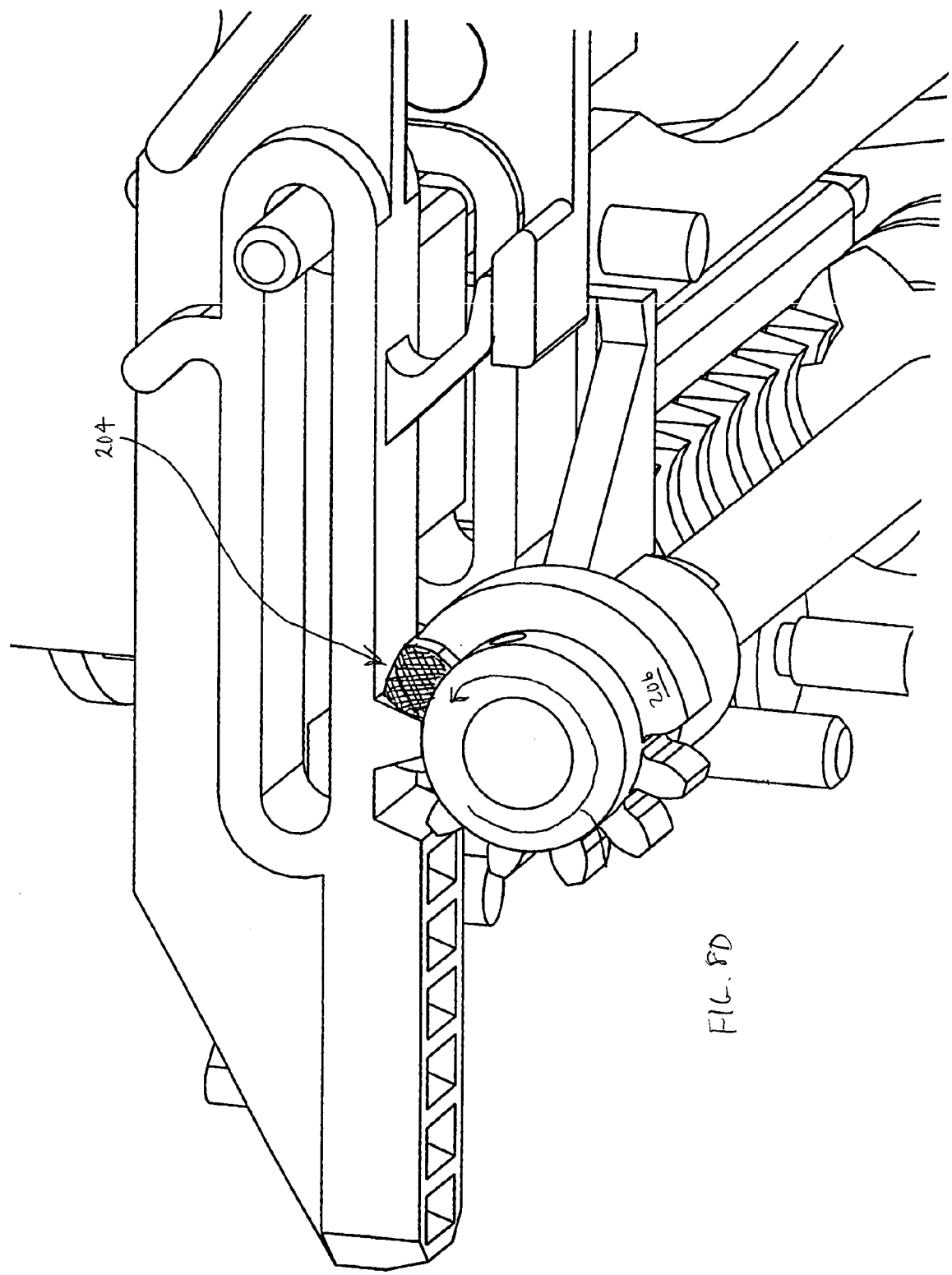

In accordance with other aspects of the present invention, the synchronizer tooth 204 can be used to provide a locking mechanism for retaining the actuator 126 and receiver 104 in place during operation of the tape drive 100. After the drive shaft 120 has completed its rotation through the third rotational distance $\theta_3$, the synchronizer tooth 204 will have come into contact with the back side of the pair of synchronizer flanges 212, as shown in FIGS. 7D and 8D. Because the synchronizer tooth 204 is wider than the lateral stability cog 206 and the gear teeth 202, it does not pass between the flanges 212. Instead, the synchronizer tooth 204 applies a forward force upon the back side of the synchronizer flanges 212. At this point, the drive shaft motor 136 can be turned off and/or locked to inhibit further rotation of the drive shaft 120 in either direction. Because the drive shaft 120 is prevented from rotating, the position of the synchronizer tooth 204 is fixed. This effectively blocks horizontal movement of the actuator 126. The cams 132 of the actuator 126, in turn, apply a locking downward force upon the receiver 104, thereby preventing vertical movement of the receiver 104. This can help to prevent the tape cartridge 106 from disengaging from the reel driver 110 in the event of a shock or other jarring force.

The unbuckling and unloading processes for the tape cartridge 106 may simply be a reverse of the loading and buckling process described above. First, the drive shaft motor 136 rotates the drive shaft 120 in the opposite direction through the third rotational distance $\theta_3$. The synchronizer tooth 204 first releases the pair of synchronizer flanges 212 from their locked position, the lateral stability cog 206 and the gear teeth 202a-202f pass between the flanges 212 such that the drive shaft 120 does not yet apply a horizontal motive force onto the receiver 104. As the drive shaft 120 rotates through the third rotational distance $\theta_3$, the drive shaft 120 provides power to the buckling mechanism to unbuckle the tape cartridge 106 from the take-up leader on the tape drive 100. At the end of the third rotational distance $\theta_3$, the synchronizer tooth 204 is received in the synchronizer gap 210 and comes into contact with the front side of the flanges 212, as shown in FIGS. 7C and 8C. At this point, the drive shaft 120 via the synchronizer tooth 204 begins applying a motive force in the rearward direction to the actuator 126. As the drive shaft 120 continues to rotate, the actuator 126 begins its rearward horizontal movement, which, in turn, causes the receiver 104 to begin moving upward as the receiver projections 134 begin sliding back up along the actuator cams 132. The rearward travel of the actuator 126 positions the gearing portion 208 of the actuator gears 130 sufficiently rearward to come into contact with the gear teeth 202a-202f as the draft shaft 120 continues to rotate, as shown in FIGS. 7B and 8B. As the drive shaft 120 rotates through the first rotational distance of $\theta_1$, the actuator 126 and the receiver 104 move together in the rearward direction until the receiver 104 arrives at the ejected position, as shown in FIG. 7A.

It will be understood that the disengaging mechanism described above may vary in other embodiments. For example, in the above-described embodiment, the pair of synchronizer flanges 212 are used such that the lateral stability cog 206 and gear teeth 202 pass between the flanges 212 without contacting the flanges 212, but the synchronizer tooth 204 contacts both flanges 212 to provide an even, balanced force upon the front and back sides of the flanges 212. In other embodiments, however, a single synchronizer flange may be used. This single synchronizer flange may be positioned such that the lateral stability cog and the gear teeth pass alongside the single synchronizer flange without contacting the flange during rotation of the drive shaft. A synchronizer tooth may be provided having a size sufficient to contact the synchronizer flange, or, alternatively, may be provided with a protruding flange or member which contacts the synchronizer flange as the drive shaft rotates to provide a horizontal force upon the actuator.

The synchronizer tooth 204 and the synchronizer flanges 212 described above may also be utilized in an initial calibration process performed by the tape drive 100. During the initial set up stage, the tape drive 100 may be configured to run the drive shaft motor 136 in a first direction until the synchronizer tooth 204 is firmly pressed against the synchronizer flanges 212 at one end of the allowable rotation. Then, the drive shaft motor 136 can be rotated in the opposite direction until the synchronizer tooth 204 is again firmly pressed against the synchronizer flanges 212 at the other end of the allowable rotation. A tachometer may be coupled to the drive shaft motor 136 to monitor the number of rotations required for the drive shaft 120 to travel from one end of rotation to the other. This number can be stored in the tape drive memory and accessed each time a tape cartridge 106 is loaded or unloaded such that the drive shaft motor 136 can be rotated the precise number of rotations to complete the loading process, without subjecting the motor 136 to a physical barrier. Accordingly, the drive shaft motor 136 may experience less stress from repeated loading operations.

By utilizing a single drive shaft 120 to power identical sets of gears on two actuators 126 positioned on either side of the receiver 104, improved synchronization of the movement of the two actuators 126, and therefore the receiver 104, can be achieved. This can provide balanced and smooth operation of the loading process. However, in other embodiments, differing numbers of actuators (such as a single actuator 126) may be used.

As described above with respect to FIGS. 7-8, a single drive shaft 120 may be used to power both the loading mechanism as well as the buckler mechanism for the tape drive 100. FIGS. 9 and 10A-10G illustrate a buckler assembly 124 and buckler driving mechanism 220 in accordance with embodiments of the present invention.

Figure 9:
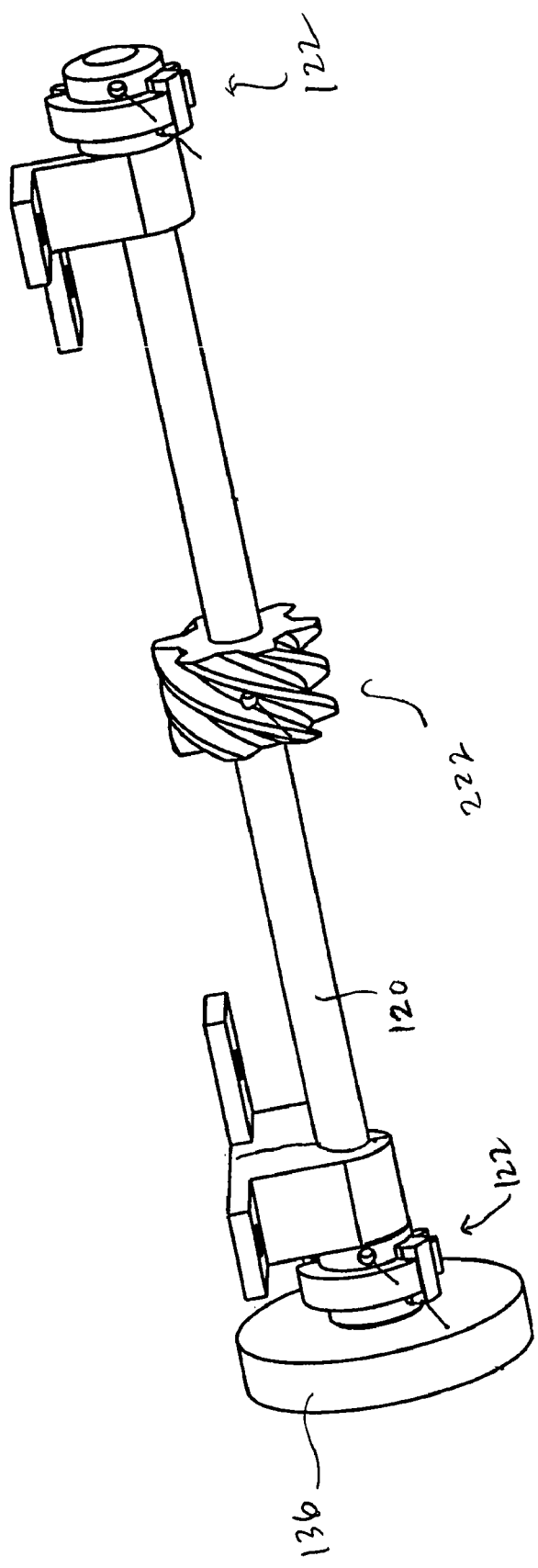
FIG. 9 shows a drive shaft in accordance with embodiments of the present invention.
Figure 6A:
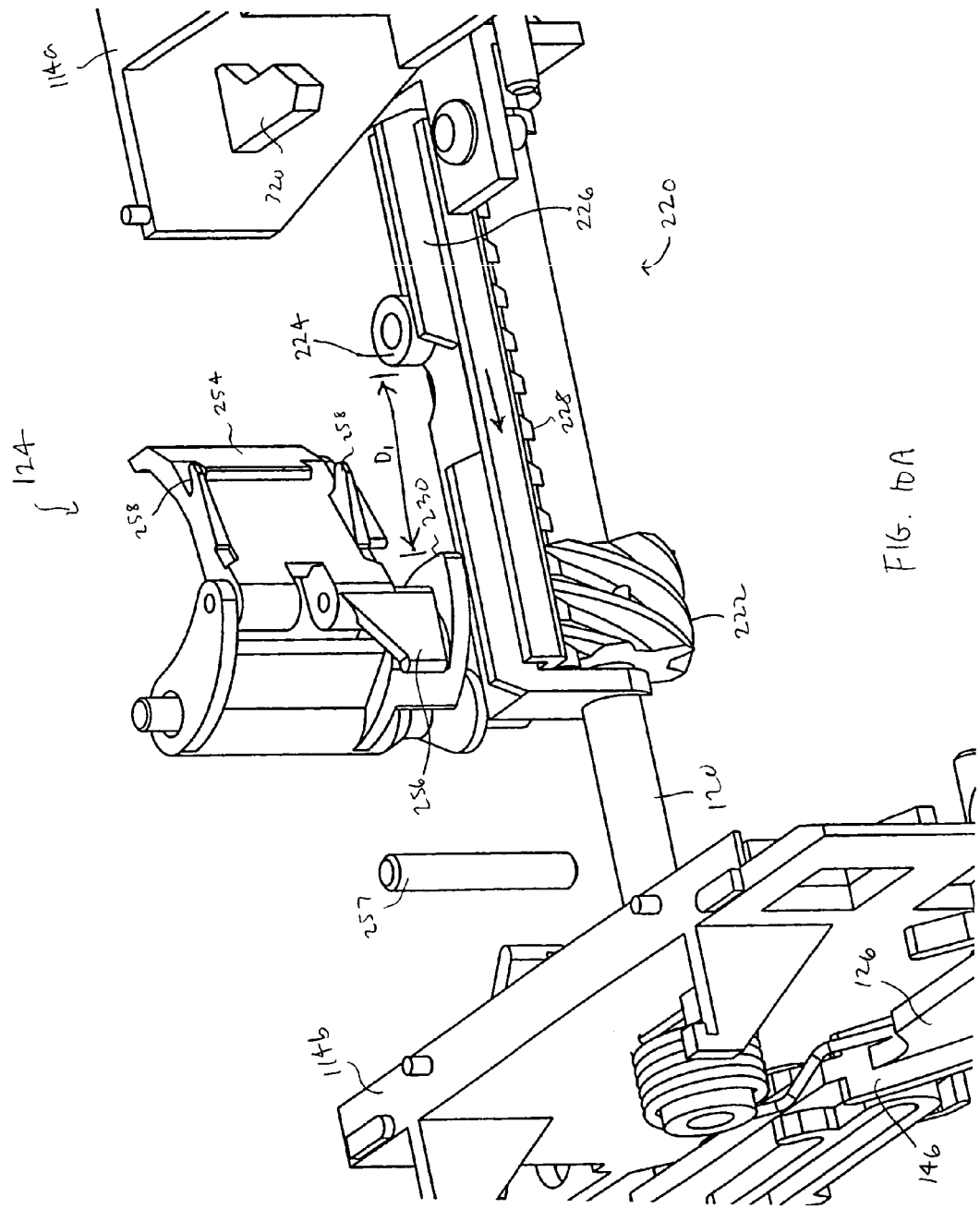

FIG. 9 shows a drive shaft 120 including a worm gear 222. FIG. 10A shows a buckler assembly 124 in at the start of loading, with the receiver 104 in the ejected position. In the illustrated embodiment, the buckler driving mechanism 220 comprises the worm gear 222 provided on the drive shaft 120, and a slide 226, which is rotatably coupled to the drive shaft 120 such that the slide 226 can move laterally in a direction parallel to the axis of rotation of the drive shaft 120. The slide 226 includes slide gearing 228, which mate with the worm gear 222 such that as the drive shaft 120 rotates, the worm gear 222 and the slide gearing 228 cooperate to move the slide in a lateral direction. In the view depicted in FIG. 10A, as the drive shaft 120 rotates in the direction for moving the receiver 104 from the ejected position to the loaded position, the slide 226 is moved from right to left (referred to herein as the "buckling direction"). The slide 226 is also provided with a slide projection 224, which engages a buckler cam 230 as the slide 226 moves in the buckling direction. In the embodiment shown, the slide projection 224 comprises a bushing or bearing. At the start of the loading process (as shown in FIG. 10A), the slide projection 224 is a distance $D_1$ from the buckler cam 230.

Figure 10B:
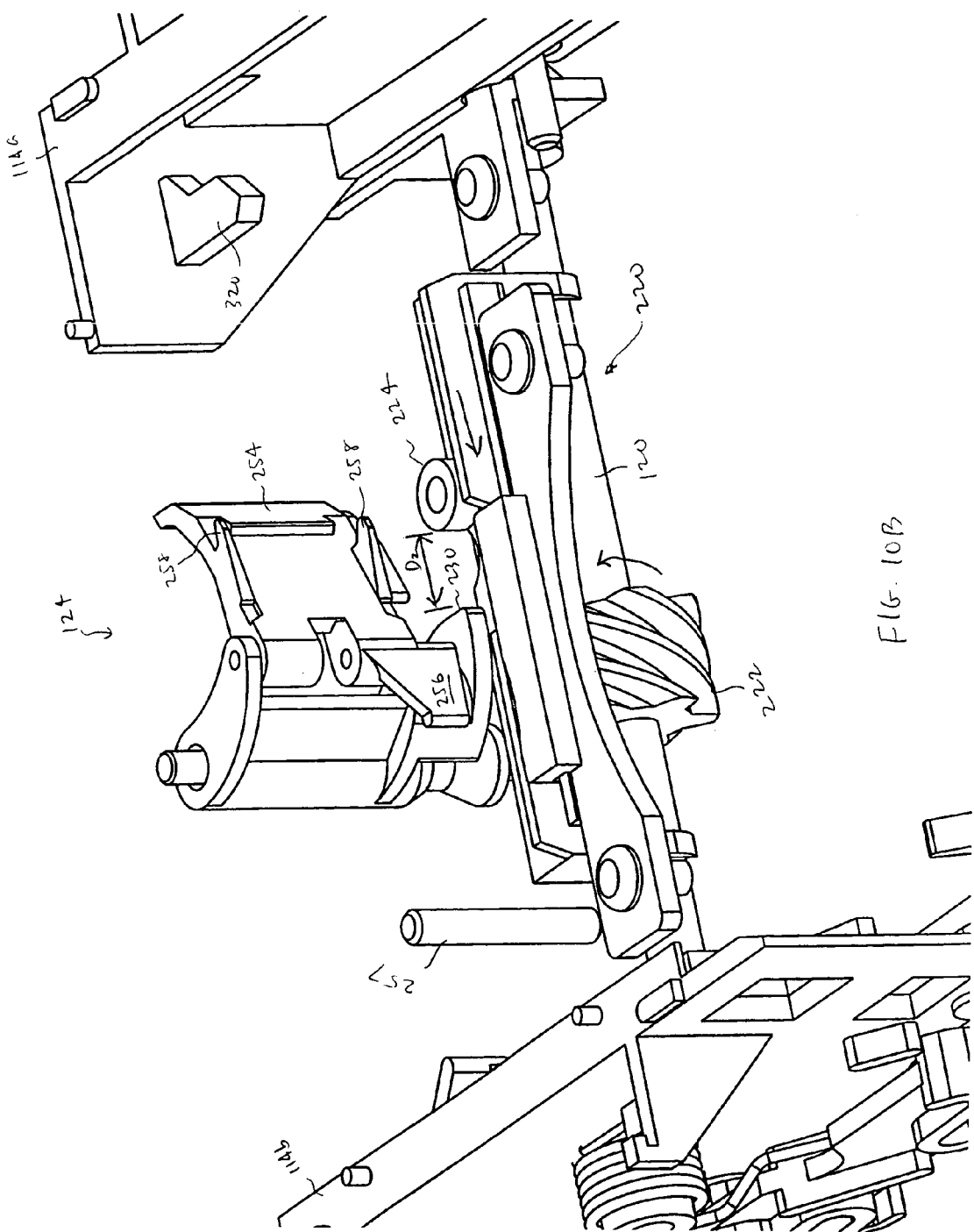

As described above, when the tape drive 100 begins the loading process, the drive shaft 120 rotates, thereby causing forward movement of both the actuators 126 and the receiver 104. FIG. 10B shows the position of the slide 226 after the drive shaft 120 has rotated sufficiently far for the receiver 104 to have completed the first loading stage (i.e., the receiver 104 has completed its forward movement). At this point, the slide projection 224 is a distance $D_2$ from the buckler cam 230.

Figure 10C:
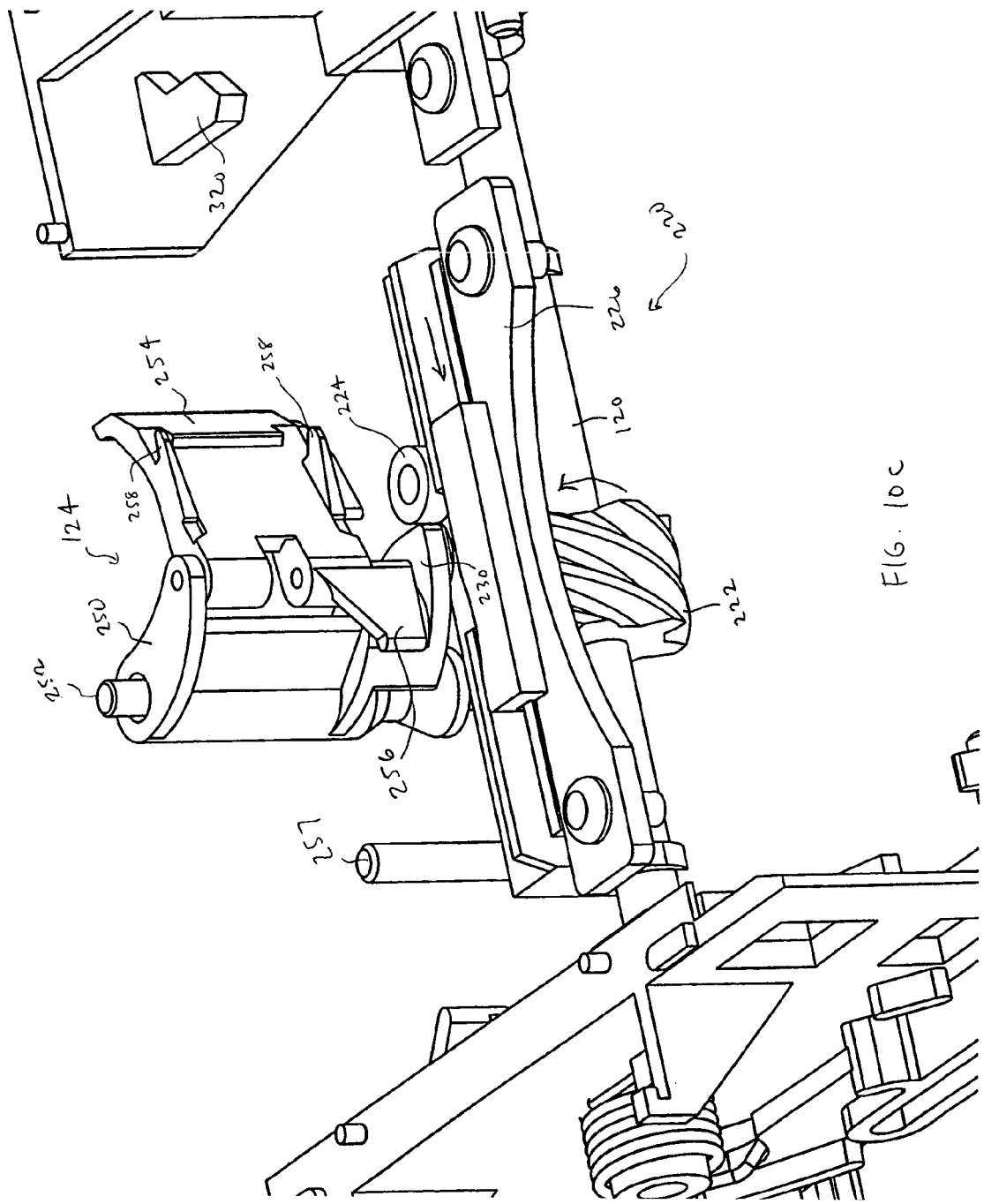

Next, the drive shaft 120 continues to rotate through the second and third loading stages until the receiver 104 completes its downward movement. At this point, the slide 226 is positioned as shown in FIG. 10C, with the slide projection 224 just beginning to contact the buckler cam 230. It is also at this point that the synchronizer tooth 204 has pushed the actuator 126 to the fully forward position, as shown in FIGS. 7C and 8C. As the drive shaft 120 continues to rotate beyond this point, the drive shaft gears 122 no longer engage the actuator gears 130 and the drive shaft 120 begins to be used solely for the purpose of driving the buckling mechanism. It is noted that after the buckling mechanism is completed, the drive shaft 120 may be used to drive the synchronizer tooth 204 to apply the final locking pressure, as shown and described with reference to FIGS. 7D and 8D.

The buckler assembly 124 can operate to buckle a cartridge leader in the tape cartridge 106 with a take-up leader in the tape drive 100, as would be well known to one of ordinary skill in the art. One exemplary buckler assembly 124 is described in U.S. Pat. No. 6,311,915, incorporated by reference herein in its entirety. The buckler assembly 124 may include a buckler body 250 that rotates about a buckler pin 252, and a buckler arm 254 rotatably coupled to the buckler body 250. The buckler arm 254 includes an arm retraction flange 256 and a pair of take-up pin flanges 258, which retain a take-up pin (not shown) provided on the end of the take-up leader. As the slide 226 moves in the buckling direction, the slide projection 224 applies a force onto the buckler cam 230, thereby causing the buckler body 250 to rotate about the buckler pin 252. This rotation of the buckler body 250 causes the buckler assembly 124 to begin the buckling process, as shown in FIG. 10D.

Figure 10E:
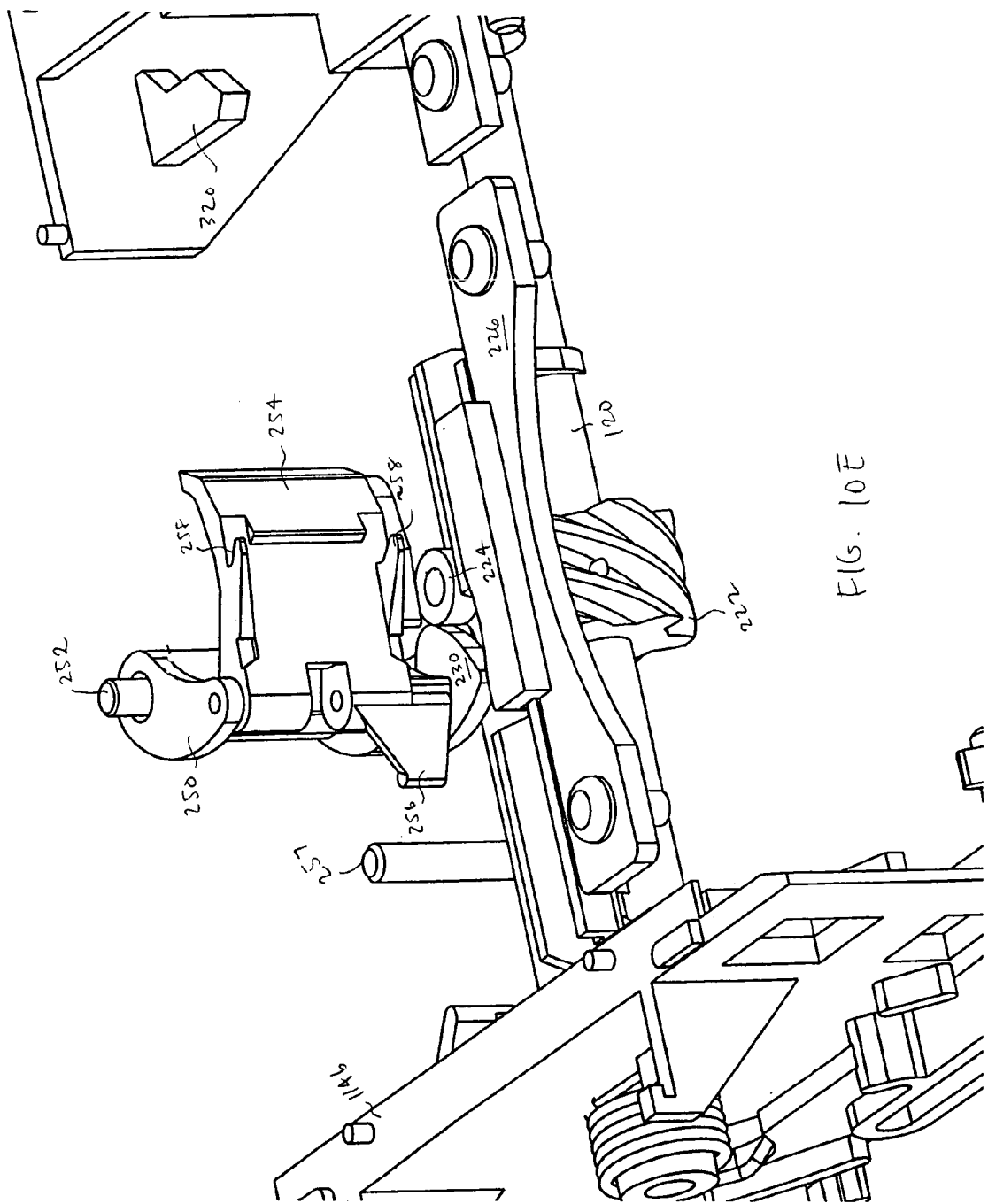

FIGS. 10E-10F illustrate the various positions of the buckler assembly 124 as drive shaft 120 continues to rotates and the slide 226 completes its travel in the buckling direction. After the buckler assembly 124 has completed buckling the tape cartridge leader with the take-up leader, the buckler assembly 124 retracts to provide clearance for the tape medium. In FIG. 10F, the buckler body 250 has rotated sufficiently far that the arm retraction flange 256 has contacted arm retraction pin 257. As the buckler body 250 continues to rotate, the arm retraction pin 257 prevents the arm retraction flange 256 from moving with the buckler body 250, thereby causing the buckler arm 254 to retract, as shown in FIG. 10G. At this same point, the synchronizer tooth 204 has come to rest against the synchronizer flange 212, thereby locking the receiver 104 in the fully loaded position, as shown in FIGS. 7D and 8D. The tape cartridge 106 is now fully loaded and fully buckled to the take-up leader, so the tape drive 100 can begin reading data off of the tape medium. Due to the nature of the interaction between the slide projection 224 and the buckler cam 230, the slide projection 224 need not be precisely positioned in order to ensure that the buckler 124 is fully retracted.

The unbuckling process is essentially the reverse of the buckling process. As the drive shaft 120 begins rotating in the opposite direction, the slide 226 begins moving from left to right (in the perspective depicted in FIG. 10G). This direction is hereinafter referred to as the unbuckling direction. This movement of the slide 226 causes the slide projection 224 to release its pressure upon the buckler cam 230. A torsion spring may be provided in buckler assembly 124 to cause the buckler body 250 to rotate back to the original position at the beginning of the loading process, as the slide projection 224 continues to release its pressure upon the cam 230.

As the drive shaft 120 continues to rotate, the slide 226 moves in the unbuckling direction until the slide projection 224 no longer applies any force upon the cam 230, as shown in FIG. 10C. At this point, the tape cartridge leader has been fully unbuckled from the take-up leader, and the buckler assembly 124 has completed the unbuckling process. Further rotation of the drive shaft 120 causes the rearward movement of the actuator 126, which, in turn, causes the beginning of the upward movement of the receiver 104. The slide 226 is still driven by the buckler driving mechanism 220 to travel in the unbuckling direction. However, since the slide projection 224 is no longer contacting the buckler cam 230, the slide 226 is not serving any other function. Further rotation of the drive shaft 120 completes the unloading process for the receiver 104, as described above.

Figure 18A:
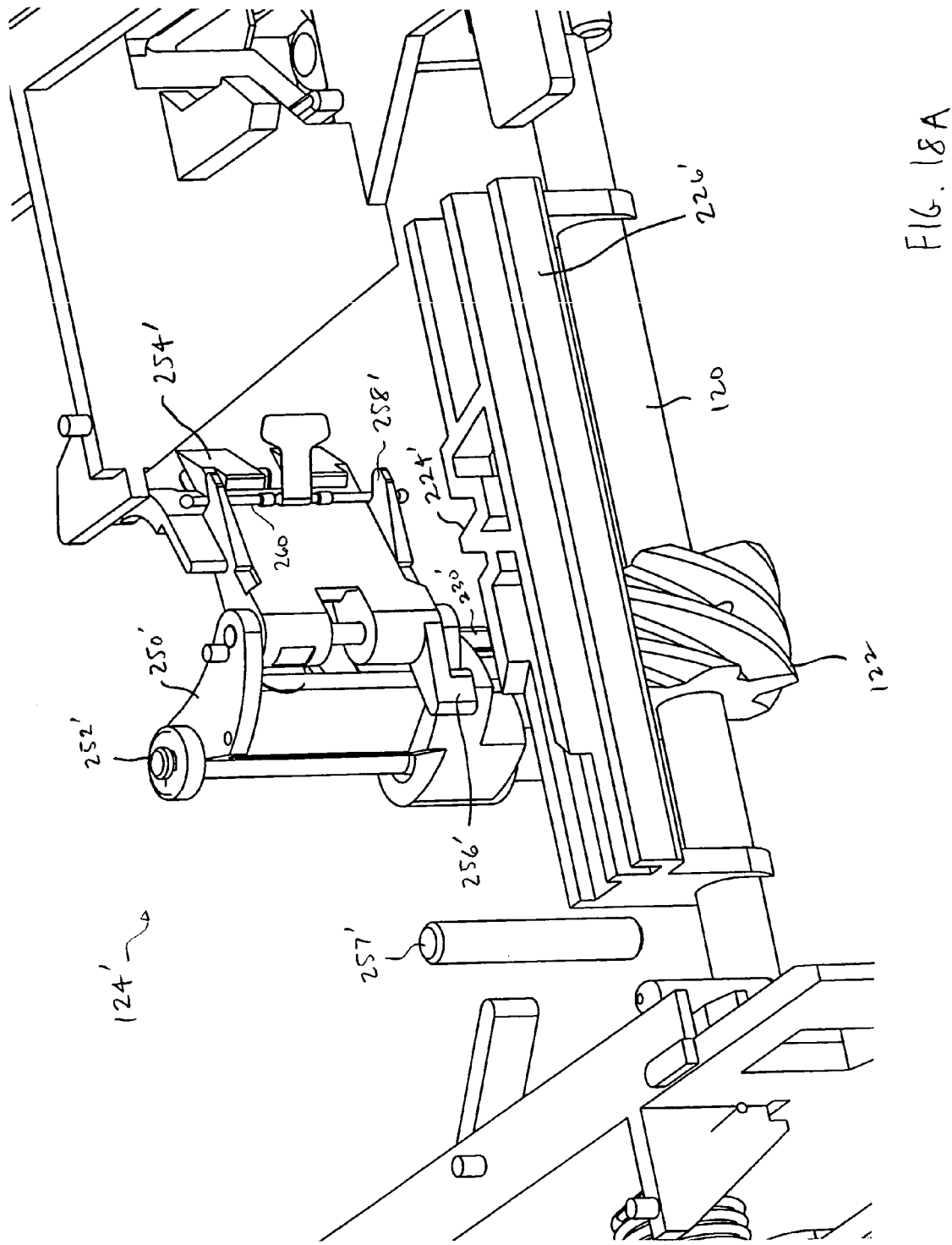
FIGS. 18A-18C show the operation of a buckler assembly in accordance with other embodiments of the present invention.
Figure 18B:
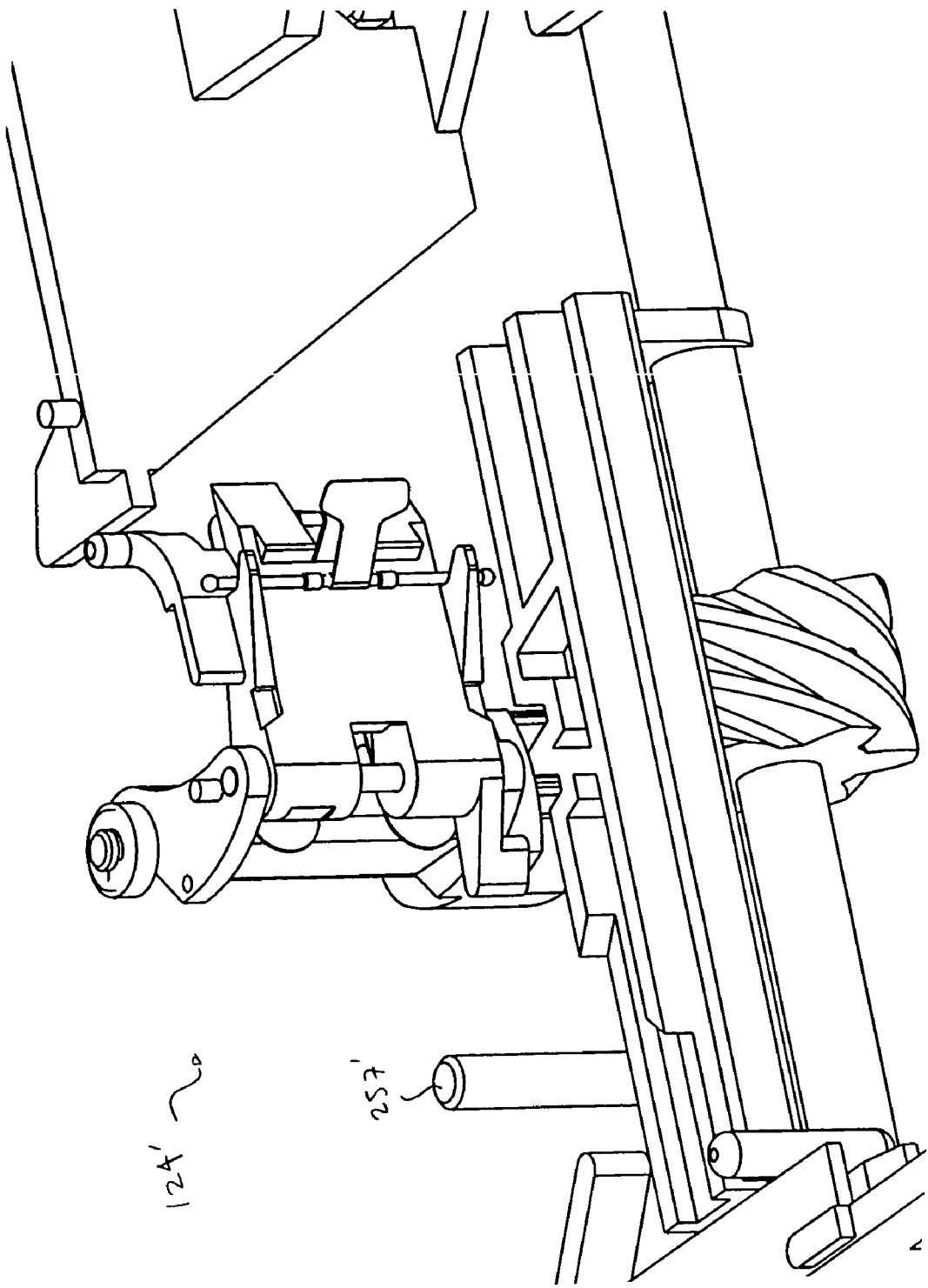
Figure 18C:
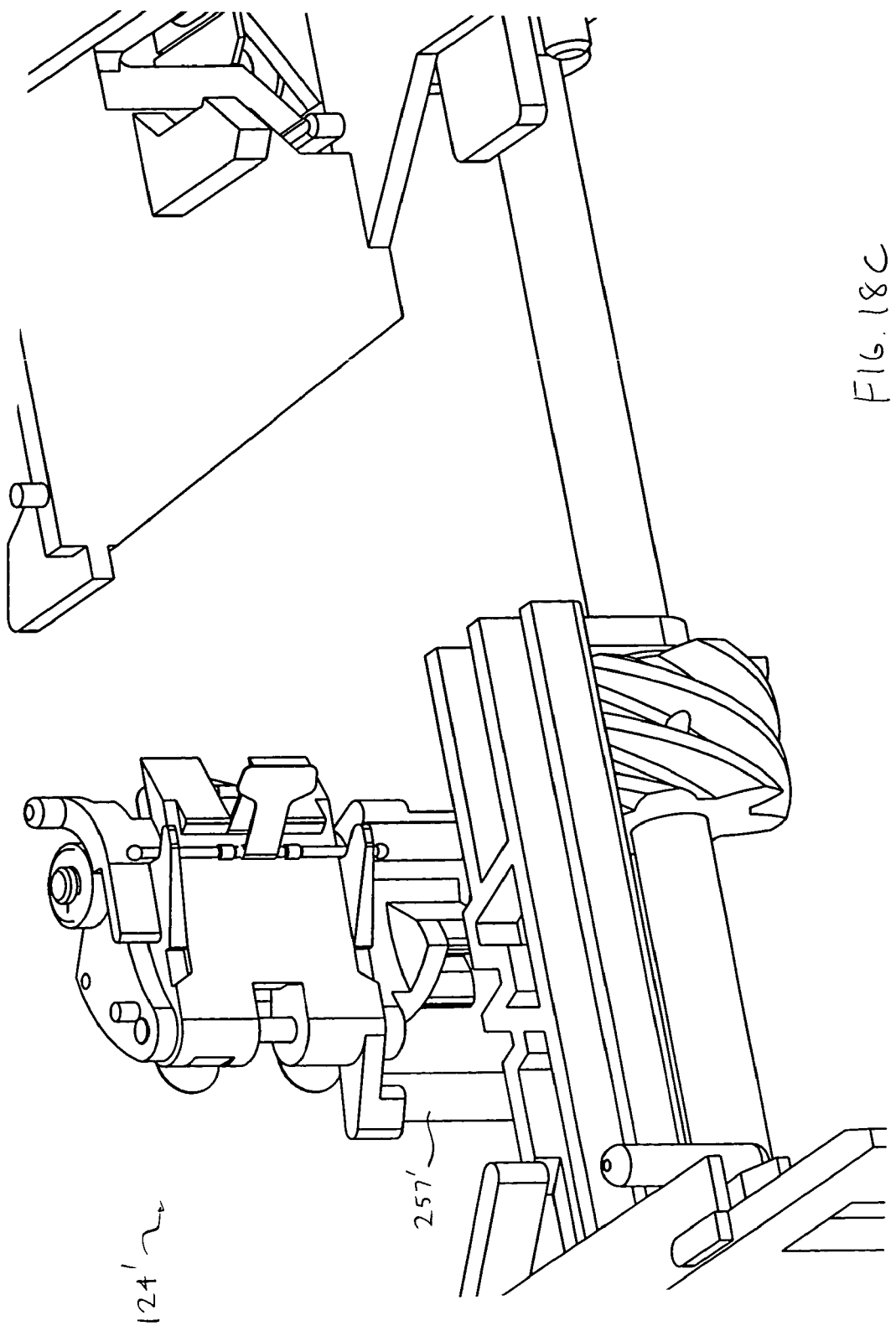

FIGS. 18A-18C illustrate a buckler driving process in accordance with another embodiment of the present invention. In this embodiment, the slide 226' utilizes a pair of gear teeth 224' in place of slide projection 224 (shown in FIGS. 10A-10G) to drive the rotation of the buckler assembly 124'. The pair of gear teeth 224' on the slide 226' mate with a pair of buckler gear teeth 230', which replace the buckler cam 230 of FIGS. 10A-10G. By utilizing a direct connection between gear teeth in this embodiment, a torsion spring is not used to maintain contact between the slide projection 224 and the buckler cam 230. The buckler assembly 124' may be directly driven by the slide 226' during both the buckling and unbuckling processes. Otherwise, the general operation of the bucker assembly 124' is similar to the buckler assembly 124 described above with respect to FIGS. 10A-10G. Also shown in FIGS. 18A-18C is a take-up pin 260, which is provided at the end of the take-up leader (not shown) and is coupled with the cartridge leader during the buckling process.

Figure 11:
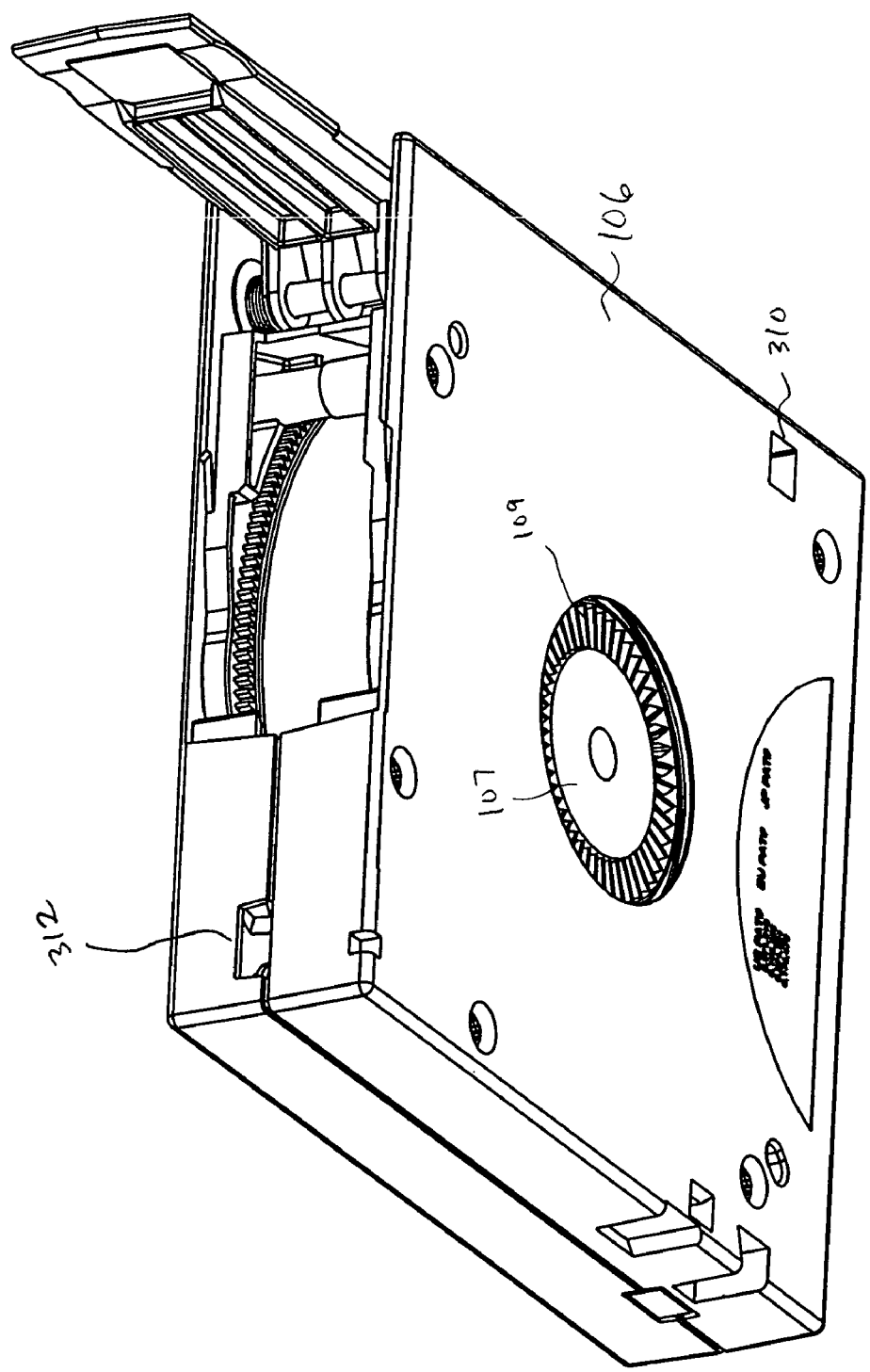
FIG. 11 shows a tape cartridge which may be used in tape drive systems in accordance with embodiments of the present invention.

Many tape cartridges utilize one or more brakes for locking the cartridge reel 107 when the tape cartridge 106 is not loaded in the tape drive 100. In SDLT-type tape cartridges, an example of which is shown in FIG. 11, two brakes are provided: a right brake 310 and a left brake 312. When the tape cartridge 106 is first loaded into the receiver 104 of the tape drive 100, a fixed brake release 320 (shown in FIGS. 10A-10G) provided on the inside of the receiver 104 is inserted into the right brake 310 opening, thereby releasing the right brake 310. If the left brake 312 is still engaged while the right brake 310 is released, the two brakes 310, 312 may cause an unbalanced force upon the tape cartridge reel 107, thereby causing the cartridge reel 107 to shift slightly out of its expected position. If the tape cartridge 106 is lowered onto the reel driver 110 with the cartridge reel 107 slightly askew from the reel driver's axis of rotation, the two components may not couple properly.

Figure 12A:
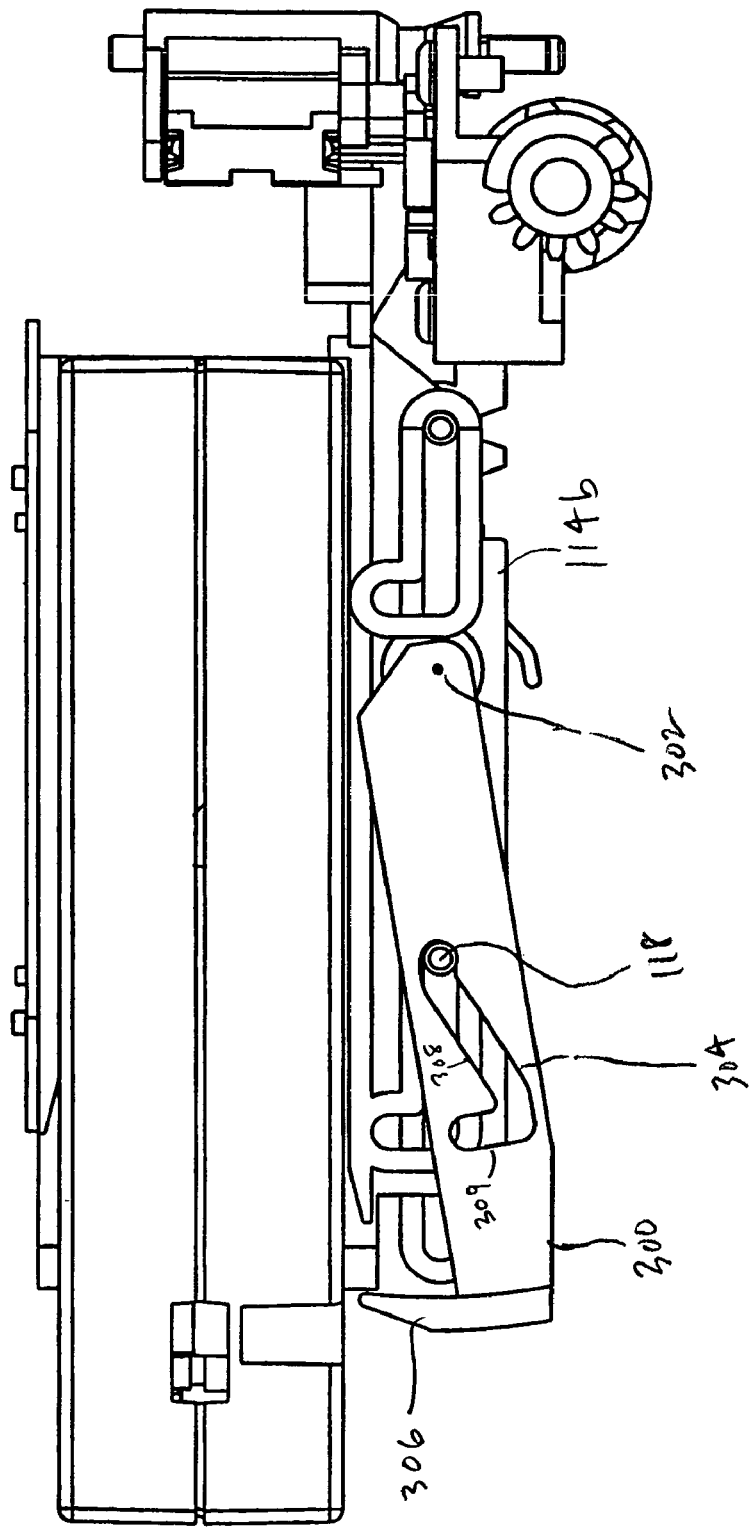
FIGS. 12A-12B show a brake release lever in accordance with embodiments of the present invention.
Figure 12B:
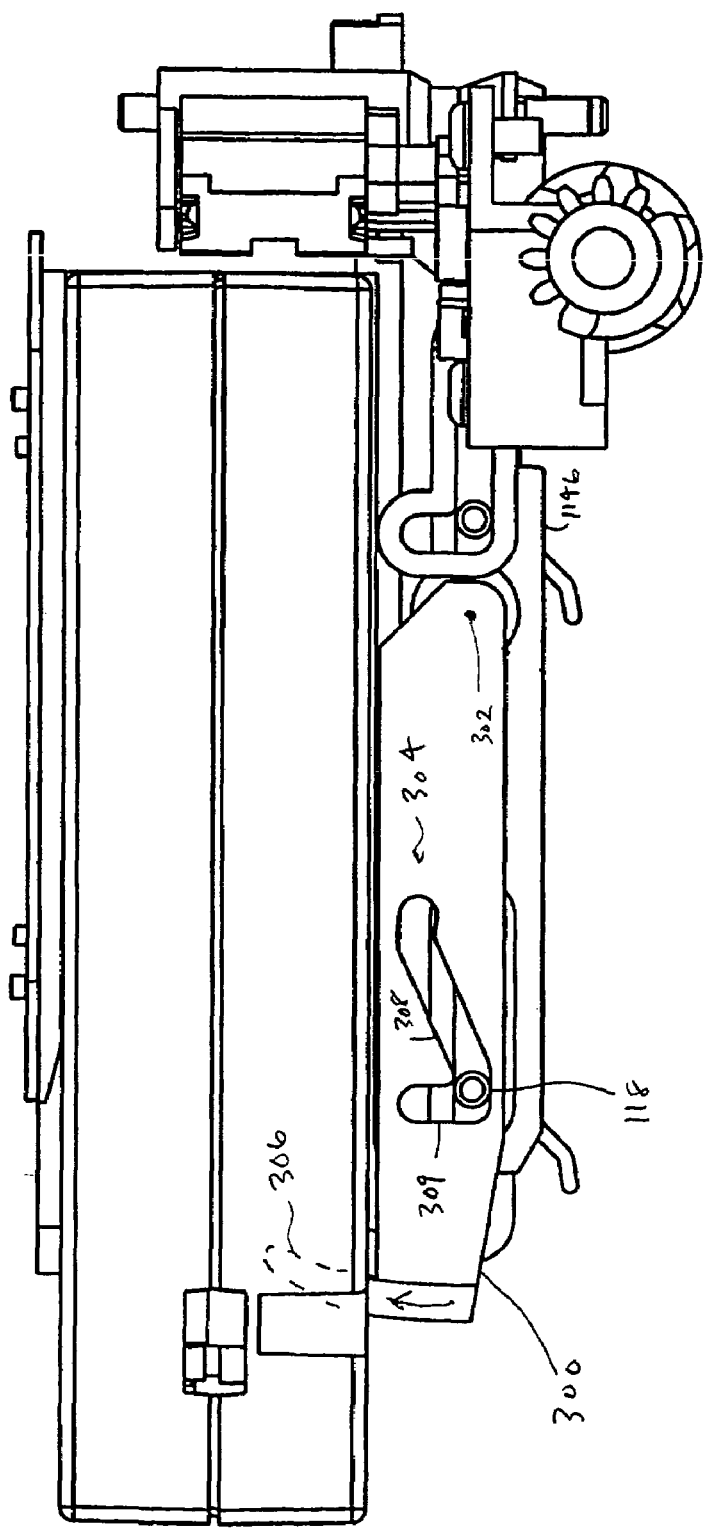

In accordance with embodiments of the present invention, a brake release lever 300 is provided for releasing the left brake 310 prior to the cartridge reel 107 coupling the with the reel driver 110. As shown in FIG. 12A, the brake release lever 300 may be provided along the interior side of the second side wall 114b of the receiver 104. A brake release pin 302 is provided along the inside of the second side wall 114b, and the brake release lever 300 is rotatably attached to the brake release pin 302. The brake release lever 300 is further provided with a brake release slot 304, which is mated with one of the guide pins 118. In some embodiments, the brake release pin 302 may be provided as part of the single molded plastic body forming the brake release lever 300, rather than be provided as a separate component, in order to reduce part count and decrease manufacturing complexity.

As the receiver 104 travels in the forward direction, the brake release pin 302 pulls the brake release lever 300 in the forward direction as well. However, the guide pins 118, which are fixedly attached to the tape drive body 102, remain stationary. The brake release slot 304 includes a first portion 308 and a second portion 309. The first portion 308 of the brake release slot 304 is shaped such that as the brake release lever 300 moves forward and the guide pin 118 travels along the brake release slot 304, a brake release flange 306 provided at the distal end of the brake release lever 300 moves upward. After the receiver 104 has completed its travel in the forward direction, the guide pin 118 will have reached the end of the first portion 308, thereby causing the flange 306 to have fully penetrated the tape cartridge 106. This results in the release of the left brake 310 prior to the coupling of the tape cartridge reel 107 with the reel driver 110 of the tape drive 100.

The second vertical portion 309 of the brake release slot 304 accommodates the downward movement of the receiver 104 and tape cartridge 106. As the receiver 104 moves downward, the guide pin 118 moves up through the second portion 309 of the slot 304, enabling the brake release lever 300 to remain in the same position relative to the tape cartridge 106. A spring may be provided to maintain a constant upward force on the brake release lever 300.

The above-described brake release lever 300 can provide a mechanism for releasing a tape cartridge brake using only a single additional moving part (i.e., the brake release lever 300). The brake release lever 300 is actuated by the same guide pin 118 as the receiver 104 and the actuator 126, thereby providing a very simple brake release mechanism without the need for additional gearing and/or motors. In addition, the brake release lever 300 can release the left brake prior to the mating of the tape cartridge reel 107 with the reel driver 110, thereby reducing the possibility of a misalignment error.

In accordance with embodiments of the present invention, a plurality of guide pins 118 are provided on the stationary tape drive body 102. These guide pins 118 may be mated with receiver guide slots 116 and actuator guide slots 128 and used to guide both the receiver 104 and the actuators 126. This design may enable the tape drive body 102 and guide pins 118 to be formed out of metal (e.g., stamped sheet metal or casting having metal guide pins 118 attached thereto), to provide a stable and structurally sound platform for the mechanical components of the tape drive 100. During the loading process, the largest focused load levels are typically applied to the guide pins 118. By locating the guide pins 118 on the tape drive body 102, these loads are supported by the rigid and stationary tape drive body 102, rather than the other moving components of the tape drive 100. Thus, the loads upon the receiver 104 and the actuators 126 may be reduced. This may enable the receiver 104 and the actuators 126 or portions of those components to be formed using a softer or weaker material, such as, e.g., injection molded plastic. When the tape drives 100 are manufactured in relatively small quantities, the use of polymer or plastic can significantly decrease the cost of materials and manufacturing.

In addition, the simplified design of the tape drive components is well suited for inexpensive plastic fabrication. Other tape drive systems have complicated mechanical designs which require expensive tooling methods, such as progressive cavity stamping. Injection-molded plastic parts can be formed using a single process, thereby significantly lowering manufacturing costs. Moreover, embodiments of the present invention may use identical actuators 126 on either side of the receiver 104. By utilizing identical components, the amount of tooling required to manufacture the tape drive 100 is decreased, thereby decreasing part count and part cost.

The formation of portions of tape drive components out of polymer or plastic may provide additional enhancements related to friction and wear. For example, by making the guide slots 116 and the guide slots 128 out of low friction plastic, decreased friction may be experienced between the slots 116, 128 and the guide pins 118 during the loading process. Accordingly, the guide pins 118 may be made out of solid metal, without the need for additional bushings or bearings for reducing friction and/or wear. In addition, decreased friction and improved wear resistance may be provided when two plastic components (such as, e.g., the cams 132 and projections 134) are in contact and moved relative to each other.

The use of polymer to form the actuator 126 may further decrease manufacturing costs because the actuator 126 may be injected molded into the final desired shape in a single step. Accordingly, the gearing portion 208 of the actuator 126 may be formed integrally with the actuator 126 and need not be added during a later step or as an additional part.

Systems which utilize a single set of guide pins 118 for guiding both the horizontal and vertical movement of the receiver 104, as described above, may also reduce the total part count and complexity of the tape drive 100. For instance, other tape drive systems may utilize a first set of pins mating with a first set of slots for guiding the horizontal movement of the receiver, and then utilize a second set of pins mating with a second set of slots for guiding the vertical movement of the receiver. This may increase the complexity of the mechanical design.

In embodiments of the invention described above, a first pair of guide pins 118 are provided for mating with a first pair of guide slots 116 on a first side wall 114*a* of the receiver 104, and a second pair of guide pins 118 are provided for mating with a second pair of guide slots 116 on a second side wall 114*b* of the receiver 104. All of the guide pins 118 are used to guide both the horizontal and vertical movement of the receiver 104. By providing a pair of guide pins 118 on each side of the receiver 104, a balanced support may be provided for the receiver 104, while minimizing the total part count and number of guide pins 118. In other embodiments, greater or fewer numbers of guide pins 118 may be used. For example, in some embodiments, a single guide pin 118 may be used with a single guide slot 116 for guiding the loading movement of the receiver 104. In this case, additional support mechanisms may be provided for supporting the receiver during its guided movement. In other embodiments, a single guide pin 118 may be used on each side 114*a*-114*b* of the receiver 104.

Embodiments of the present invention may also enable better tolerances between the various components. For example, when the guide pins 118 are formed as part of the stationary tape body 102, the locations of the guide pins 118 can be easily preset and maintained during manufacturing. Thus, the guide pins 118 can be used to serve as a fixed datum from which the movements of the other components can be tracked. In addition, because the guide pins 118 are used to directly mate with all of the moving load components of the tape drive 100 (e.g., the receiver 104 and the two actuators 126), there is only one dimension and its associated variation or tolerance determining the location of the tape cartridge 106 relative to the tape drive body 102. In other tape drive systems, the tape drive body may be coupled to a first moving component, which, in turn, is coupled to a second moving component that holds the tape cartridge. Because the components are coupled to each other, rather than to a fixed point on the tape drive body, a second dimension is introduced. This second dimension may therefore require tighter tolerances in the various parts in order to maintain same level of precise positioning of the tape cartridge during the loading process as achieved by embodiments of this invention.

In yet other embodiments utilizing multiple guide pins 118, differing tolerances may be used for the different guide pins 118. For example, in the system described above with respect to FIGS. 1-8 in which a first pair of guide pins 118 are provided along on the first side wall 114*a* and a second pair of guide pins 118 are provided along the second side wall 114*b*, a first guide pin 118 in the first pair of guide pins 118 may be tightly toleranced against the first guide slot 116. This first guide pin 118 may serve as the control for precise positioning of the receiver 104. The second guide pin 118 in the first pair of guide pins 118 may be provided with additional clearance between the guide slot 116 and the guide pin 118. This enables the second guide pin 118 to serve as a secondary support and guide for the receiver 104, while preventing binding of the receiver movement in the event that there is a slight error in the positioning of the guide slots 116 relative to the guide pins 118. Similarly, the guide slots 116 on the second side wall 114*b*, and the actuator guide slots 128 on the actuator 126 can be provided with differing tolerances as well.

Embodiments of the present invention may also facilitate improved diagnosis of tape drive errors. In some tape cartridge loading systems, all of the mechanical loading steps occur in parallel. For example, in some loading systems, after the tape cartridge is loaded into the receiver, the following steps begin at approximately the same time: the reel driver rises to engage the cartridge reel 107, the tape cartridge reel brakes are released, and the buckler mechanism buckles the take-up leader. One problem caused by this design is that since all three steps occur in parallel, it becomes more difficult to troubleshoot problems because it is not immediately obvious which of the various parallel steps is the root cause of the problem. In accordance with embodiments of the present invention, various loading steps may be performed sequentially, which facilitates easier diagnosis of problems. In addition, each of these sequentially-performed loading steps may be driven by a single motor and a single drive shaft without resorting to an excessively complicated mechanical design or a larger motor capable of handling multiple loads at once.

In tape loading systems which utilize a reel driver which moves upward to engage the gears 109 (shown in FIG. 11) on the tape cartridge reel 107, some sort of positioning system must be used for translating the reel driver. This positioning system typically includes a spline gear, which may result in a loss of control over radial runout and axial runout of the reel driver. This lack of control over runout may limit the precision with which data can be written to the tape medium, thereby limiting data density, or may cause errors in the write/read process. By utilizing a tape drive system incorporating a reel driver that couples with the tape cartridge without moving vertically, improved control over runout may be achieved. A fixed reel driver may be used in the systems described above because the moving receiver positions the tape cartridge vertically above the reel driver and then lowers the tape cartridge onto the reel driver to mate the gears of the reel driver with the gears 109 of the cartridge reel 107.

Embodiments incorporating the above-described disengagement system may achieve numerous advantages over existing soft load systems. For example, a single motor driving a single drive shaft at a single rotational speed can be used to power both the receiver movement, the buckler engagement, and provide a locking mechanism to maintain all components in place during operation of the tape drive. This may enable simplified tape drive designs and reduce the number of moving parts, gears, motors, and other mechanical systems.

The foregoing description of the preferred embodiments of the invention has been presented for the purposes of illustration and description. It is not intended to be exhaustive or to limit the invention to the precise form disclosed. Many modifications and variations are possible in light of the above teaching. For example, in the embodiments described above with respect to FIGS. 1-8, two actuators 126 are provided, one adjacent to each side wall 114 of the receiver 104. Each actuator 126 may have a set of actuator gears 130 for engaging the drive shaft gears 122. In other embodiments, only a single actuator 126 maybe used.

In addition, in the embodiments described above, various steps are described as occurring sequentially during the loading process. The sequential driving of various steps may decrease the peak loads required by the drive shaft motor, thereby enabling the use of less expensive motors and/or increasing the mean time before failure. In other embodiments, the various steps may be performed in parallel or in partially parallel order. The parallel performance of steps may decrease the total time required for loading and unloading.

It is intended that the scope of the invention be limited not by this detailed description, but rather by the claims appended hereto. The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A tape drive system, comprising:
a stationary base;
at least one stationary guide projection mounted to the stationary base;
a receiver for receiving a tape cartridge and transporting the tape cartridge from an ejected position to a loaded position, the receiver comprising at least one guide slot mating with one of the at least one stationary guide projection, each guide slot being shaped to allow the receiver to move a first distance in a horizontal direction and a second distance in a vertical direction;
at least one receiver projection provided on the receiver; and
at least one linearly moveable actuator comprising at least one cam engaging the at least one receiver projection such that as the actuator moves horizontally, each cam engages one of the receiver projections to effect movement of the receiver.

2. The system of claim 1, further comprising a rotating drive shaft for driving the actuator.

3. The system of claim 1, wherein the at least one stationary guide projection comprises a first and second stationary guide projection, the second stationary guide projection mounted to a side of the stationary base opposite the first stationary guide projection; and
wherein the receiver comprises:
a top portion;
a first side and a second side opposite the first side, the first and second sides each comprising at least one receiver projection of the at least one receiver projection and at least one guide slot mating with one of the first or second stationary guide projections.

4. The system of claim 1, wherein each of the at least one stationary guide projections comprises a pin.

5. The system of claim 4, wherein the guide slot comprises a polymer.

6. The system of claim 1, further comprising:
a reel driver for mating with a cartridge reel in a tape cartridge inserted into the receiver; and
a brake release for releasing a brake in the tape cartridge prior to the cartridge reel being mated with the reel driver.

7. The system of claim 1, wherein:
each guide slot is shaped to have a horizontal region and a vertical region; and
each cam engages one of the at least one receiver projection to drive the receiver to move first in the horizontal direction until the receiver travels the first distance and then in the vertical direction until the receiver travels the second distance.

8. The system of claim 7, wherein each cam comprises a ramp such that as the cam engages the receiver projection to drive the receiver to move the first distance in the horizontal direction, the receiver projection remains in static contact with a beginning of the ramp, and as the cam engages the receiver projection to drive the receiver to move the second distance in the vertical direction, the receiver projection slides along the ramp.

9. The system of claim 8, wherein the actuator further comprises a clamping member configured to retain the receiver in the loaded position.

10. The system of claim 9, wherein the clamping member is provided at an end portion of the ramp.

11. The system of claim 1, further comprising:
a brake release lever comprising a body portion and a pivot portion rotatably coupled to the actuator and engaging a stationary member such that as the actuator moves horizontally, the pivot portion of the brake release lever translates horizontally while a distal end of the body portion of the brake release lever translates horizontally and vertically.

12. The system of claim 11, wherein the stationary member comprises the stationary guide projection.

13. The system of claim 12, wherein the body portion of the brake release lever further comprises:
an angled slot having the stationary guide projection received therein, the slot being shaped such that as the brake release lever moves horizontally, the stationary member travels through the slot to thereby translate the distal end of the brake release lever vertically.

14. The system of claim 13, wherein the brake release lever further comprises:
a flange provided at the distal end of the brake release lever, the flange being configured to enter a brake release aperture in a tape cartridge received in the receiver as the brake release lever translates vertically.

15. The system of claim 1, further comprising:
a spring applying an upward force on the receiver in the vertical direction.

16. The system of claim 15, wherein the spring and the receiver are configured such that the spring applies a variable upward force on the receiver.

17. The system of claim 16, wherein:
the spring comprises a torsion spring coupled to the receiver, the torsion spring having a spring axis and an elongated spring arm extending from the spring axis and applying a force onto a spring contacting member of the actuator at a contact point along the spring arm; and
the spring arm and the spring contacting member are positioned such that as the receiver moves vertically to the loaded position, the contact point moves closer to the spring axis, thereby increasing the force applied by the spring arm onto the spring contacting member.

18. A method of loading a tape cartridge into a tape drive system having a stationary base and at least one guide projection mounted to the stationary base, comprising:
receiving a tape cartridge in a receiver having at least one guide slot having a first portion and a second portion; and
moving the receiver from an ejected position to a loaded position by:
passing the guide projection through the first portion of the guide slot to move the receiver a first distance in a horizontal direction; and
passing the guide projection through the second portion of the guide slot to move the receiver a second distance in a vertical direction, wherein the moving the receiver from the ejected position to the loaded position comprises:

linearly translating an actuator having at least one cam;

engaging the at least one cam with the receiver such that linear movement of the actuator causes movement of the receiver.

19. The method of claim 18, further comprising:

releasing a brake in the tape cartridge using a brake release lever comprising a body portion and a pivot portion rotatably coupled to the actuator and engaging a stationary member such that as the actuator moves horizontally, the pivot portion of the brake release lever translates horizontally while a distal end of the body portion of the brake release lever translates horizontally and vertically.

20. The method of claim 18, further comprising:

applying a variable upward force in the vertical direction on the receiver.

21. The method of claim 18, wherein the linearly translating the actuator comprises:

rotating a drive shaft;

engaging an actuator gear on the drive shaft with a gear on the actuator to linearly translate the actuator.

22. The method of claim 18, wherein the engaging the cam with the receiver comprises:

engaging the at least one cam with the receiver such that each cam engages a receiver projection on the receiver to drive the receiver to move first in the horizontal direction until the receiver travels the first distance and then in the vertical direction until the receiver travels the second distance.

23. The method of claim 22, wherein:

the engaging the at least one cam with the receiver such that each cam engages the receiver projection on the receiver to drive the receiver to move first in the horizontal direction until the receiver travels the first distance comprises statically engaging the cam with the receiver projection; and the engaging the at least one cam with the receiver such that each cam engages the receiver projection on the receiver to drive the receiver to move in the vertical direction until the receiver travels the second distance comprises slidably engaging the cam with the receiver projection.

24. The method of claim 18, further comprising:

clamping the receiver in the loaded position using a clamping member provided on the actuator.

25. The method of claim 18, further comprising:

releasing a brake in the tape cartridge prior to mating a cartridge reel in the tape cartridge with a reel drive in the tape drive system.

\* \* \* \* \*